US010063993B2

(12) United States Patent
Takahashi et al.

(10) Patent No.: US 10,063,993 B2
(45) Date of Patent: Aug. 28, 2018

(54) COMMUNICATION APPARATUS CAPABLE OF MEDIATING WIRELESS COMMUNICATIONS FOR EXTERNAL APPARATUS

(71) Applicant: CANON KABUSHIKI KAISHA, Tokyo (JP)

(72) Inventors: Seiji Takahashi, Tokyo (JP); Takeshi Shinomiya, Yokohama (JP); Ryuichi Ishikuri, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/691,443

(22) Filed: Apr. 20, 2015

(65) Prior Publication Data
US 2015/0312706 A1  Oct. 29, 2015

(30) Foreign Application Priority Data

Apr. 23, 2014  (JP) ................. 2014-089533

(51) Int. Cl.
*H04W 4/80* (2018.01)
*H04W 48/16* (2009.01)
(Continued)

(52) U.S. Cl.
CPC ............. *H04W 4/008* (2013.01); *H04W 4/80* (2018.02); *H04W 8/005* (2013.01); *H04W 28/18* (2013.01);
(Continued)

(58) Field of Classification Search
CPC ..... H04W 8/005; H04W 28/18; H04W 48/16; H04W 4/008; H04W 84/12; H04W 92/18
See application file for complete search history.

(56) References Cited

U.S. PATENT DOCUMENTS

2011/0113097 A1*  5/2011  Takeuchi ........... H04N 1/00183
                                                                     709/204
2012/0100803 A1*  4/2012  Suumaki ........... H04W 36/0072
                                                                     455/41.1
(Continued)

FOREIGN PATENT DOCUMENTS

CN         101107588 A       1/2008
CN         101325496 A      12/2008
(Continued)

OTHER PUBLICATIONS

Bluetooth Specification Version 4.0, Jun. 30, 2010.*

*Primary Examiner* — Yuwen Pan
*Assistant Examiner* — Zhitong Chen
(74) *Attorney, Agent, or Firm* — Canon U.S.A., Inc. IP Division

(57) ABSTRACT

A communication apparatus includes a communication unit configured to connect with an external apparatus via communication, and a control unit configured to control the communication, wherein the control unit controls, if the communication unit receives a search request including information indicating that an external apparatus satisfying a predetermined condition is a transmission source via communication, the communication unit so as to transmit a search request designating the communication apparatus as the transmission source to another apparatus via communication, wherein the control unit controls the communication unit so as to receive a search response replying to the search request designating the communication apparatus as the transmission source via communication, and wherein the control unit controls the communication unit so as to transmit information corresponding to the search response received by the communication unit to the external apparatus via communication.

16 Claims, 20 Drawing Sheets

(51) Int. Cl.
*H04W 84/12* (2009.01)
*H04W 8/00* (2009.01)
*H04W 28/18* (2009.01)
*H04W 92/18* (2009.01)
*H04W 4/00* (2018.01)

(52) U.S. Cl.
CPC ........... *H04W 48/16* (2013.01); *H04W 84/12* (2013.01); *H04W 92/18* (2013.01)

(56) References Cited

U.S. PATENT DOCUMENTS

| | | | |
|---|---|---|---|
| 2012/0262753 A1 | 10/2012 | Viccari et al. | |
| 2013/0011025 A1* | 1/2013 | Liu | H04W 12/04 382/118 |
| 2014/0355582 A1* | 12/2014 | Kamath | H04W 84/20 370/338 |
| 2016/0007396 A1* | 1/2016 | Goto | H04L 67/16 370/338 |

FOREIGN PATENT DOCUMENTS

| | | | | |
|---|---|---|---|---|
| EP | 1746518 A1 * | 1/2007 | ............ | G06F 17/30 |
| JP | 2004-503148 A | 1/2004 | | |
| JP | 2009171491 A | 7/2009 | | |
| JP | 2013-127742 A | 6/2013 | | |

* cited by examiner

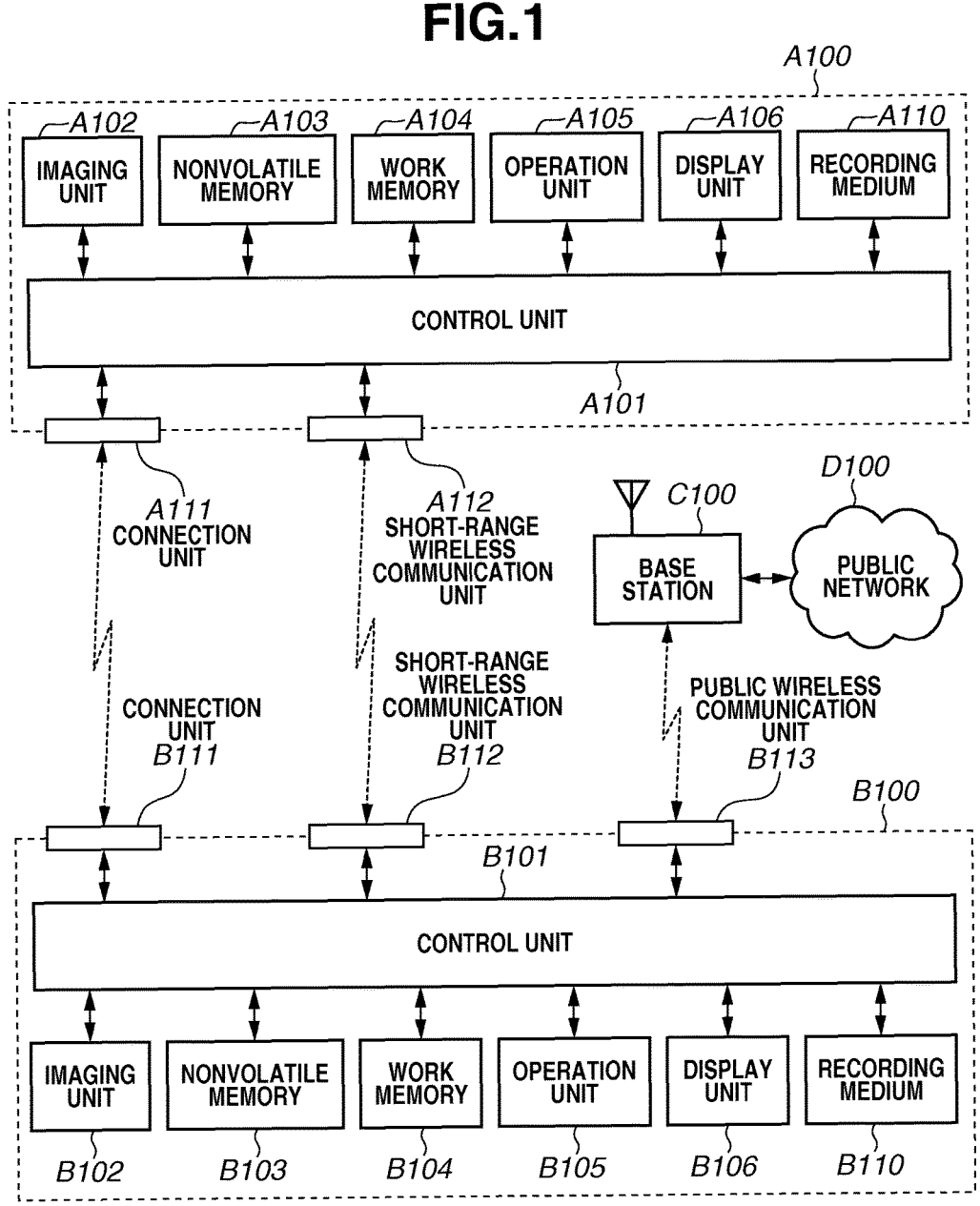

FIG.3A

*300* SMARTPHONE: CONTACT ADDRESS LIST

| DEVICE NAME | USER NAME | TELEPHONE NUMBER | ... |
|---|---|---|---|
| PHONE_003 | Johnny | XXX-XXXX-XXXX | ... |
| PHONE_004 | Anna | YYY-YYYY-YYYY | ... |
| ⋮ | ⋮ | ⋮ | |

FIG.3B

*310* SMARTPHONE: PAIRING DEVICE LIST

| DEVICE NAME | BD ADDRESS | ... |
|---|---|---|
| CAM_001 | 123456789ABC | ... |
| PC_001 | FEDCBA987654 | ... |
| ⋮ | ⋮ | |

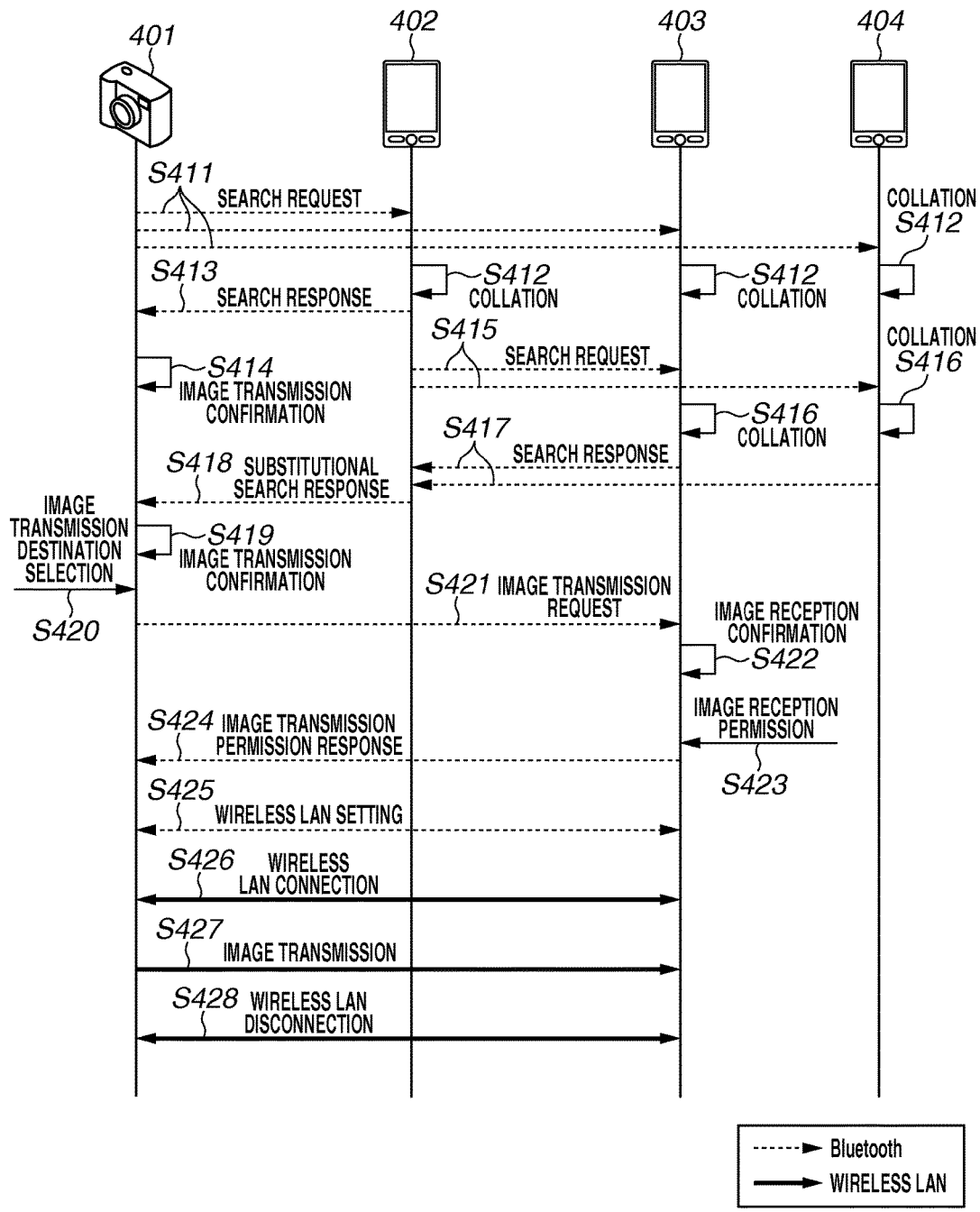

FIG.7

*700* DIGITAL CAMERA: PAIRING DEVICE LIST

| DEVICE NAME (301) | BD ADDRESS (311) | ... |
|---|---|---|
| PC_001 | FEDCBA987654 | ... |
| PHONE_002 | 1A2B3C4D5E6F | ... |
| ⋮ | ⋮ | |

FIG.20

2010 SMARTPHONE: CLOUD REGISTRATION COMPLETED DEVICE LIST

| CLOUD ID (2012) | DEVICE NAME (2001) | BD ADDRESS (2011) | ... |
|---|---|---|---|
| ID_001 | CAM_001 | 123456789ABC | ... |
|  | PC_001 | FEDCBA987654 | ... |
|  | ⋮ | ⋮ |  |
| ID_002 | CAM_002 | ABC123456789 | ... |
|  | PC_002 | 987654FEDCBA | ... |
|  | ⋮ | ⋮ |  |
| ⋮ | ⋮ | ⋮ |  |

COMMUNICATION APPARATUS CAPABLE OF MEDIATING WIRELESS COMMUNICATIONS FOR EXTERNAL APPARATUS

BACKGROUND OF THE INVENTION

Field of the Invention

The present invention relates to an apparatus that can perform wireless communications with an external apparatus.

Description of the Related Art

A recent portable telephone is equipped with a camera and can share an image captured by the camera with other portable telephones.

On the other hand, it is conventionally known that a digital camera having a wireless communication function can transmit a captured image to a portable telephone. For example, as discussed in Japanese Patent Application Laid-Open No. 2009-171491, a digital camera can wirelessly transmit image data acquired beforehand to another device via wireless LAN connection.

Compared to a case where two or more portable telephones share image data, the following problems arise when image data is shared between a camera and a portable telephone.

First, when two or more portable telephones share image data, it is feasible for each portable telephone to enhance the security by limiting sharing targets with reference to mutually registered information (e.g., telephone numbers and related ID values). Similarly, enhancing the security is feasible for a digital camera by using device information required to identify each individual camera (e.g., ID information uniquely allocated to each individual camera) instead of using the telephone number.

The above-described sharing of image data when it is performed between two or more portable telephones is not a nuisance act for each user because information required in mutual authentication can be easily exchanged through a customary procedure of exchanging telephone numbers.

On the other hand, the above-described sharing of image data when it is performed between a camera and a portable telephone tends to become a nuisance act for a user because registering mutual information between the camera and each portable telephone owned by other user is unusual compared to the above-described registration performed between two or more portable telephones. In addition, performing the above-described registration for each of portable telephones owned by a plurality of friends is not realistic because it takes a long time to repetitively perform the same procedure.

SUMMARY OF THE INVENTION

According to an aspect of the present invention, a communication apparatus includes a communication unit configured to connect with an external apparatus via communication in compliance with a first communication method, and a control unit configured to control the communication to be performed by the communication unit, wherein the control unit controls, if the communication unit receives a search request including information indicating that an external apparatus satisfying a predetermined condition is a transmission source via communication in compliance with the first communication method, the communication unit so as to transmit a search request designating the communication apparatus as the transmission source to another apparatus via communication in compliance with the first communication method, wherein the control unit controls the communication unit so as to receive a search response replying to the search request designating the communication apparatus as the transmission source via communication in compliance with the first communication method, and wherein the control unit controls the communication unit so as to transmit information corresponding to the search response received by the communication unit to the external apparatus via communication in compliance with the first communication method.

Further features of the present invention will become apparent from the following description of exemplary embodiments with reference to the attached drawings.

BRIEF DESCRIPTION OF THE DRAWINGS

FIG. 1 is a block diagram illustrating a digital camera and a smartphone according to a first exemplary embodiment.

FIGS. 3A and 3B are schematic diagrams illustrating contact address information and pairing device information that can be held by the smartphone according to the first exemplary embodiment.

FIG. 4 is a sequence diagram illustrating a schematic procedure of communications that can be performed between the digital camera and the smartphone according to the first exemplary embodiment.

FIG. 7 is a schematic diagram illustrating pairing device information that can be held by the digital camera according to a second exemplary embodiment.

FIG. 20 is a schematic diagram illustrating a cloud registration completed device list that can be held by the smartphone according to the fifth exemplary embodiment.

DESCRIPTION OF THE EMBODIMENTS

Figure 2A:
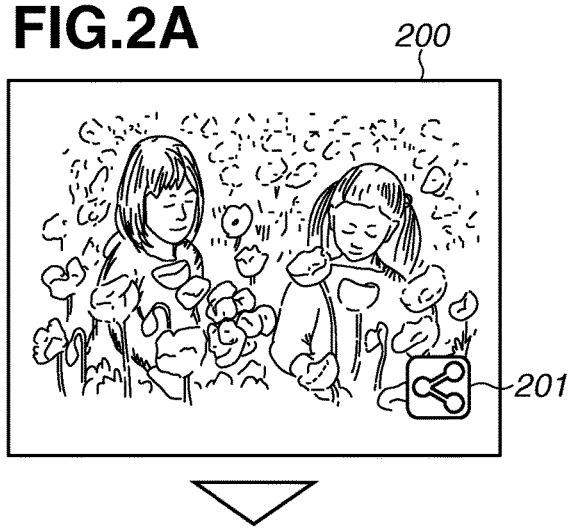
FIGS. 2A, 2B, and 2C illustrate screens that can be displayed on the digital camera according to the first exemplary embodiment

Exemplary embodiments of the present invention will be described in detail below with reference to attached drawings. Each exemplary embodiment described below is a mere example that can realize the present invention and can be corrected or changed appropriately with reference to a configuration and various conditions of an apparatus to which the present invention is applied. Further, it is also feasible to combine two or more exemplary embodiments appropriately.

<Configuration of Each Apparatus>

FIG. 1 is a block diagram illustrating a configuration of an entire system that includes a communication system according to a first exemplary embodiment of the present invention.

The system illustrated in FIG. 1 includes a digital camera and a smartphone, each of which is operable as an imaging apparatus. However, the imaging apparatus is not limited to the above-described examples. For example, the imaging apparatus can be any appropriate information processing apparatus (e.g., a portable media player, a tablet device, or a personal computer).

First, a digital camera A100 will be described in detail below.

A control unit A101 can control each unit of the digital camera A100 according to an input signal or a program described below. However, the control unit A101 can be replaced by a plurality of hardware devices that can cooperatively perform processing for controlling the entire apparatus.

An imaging unit A102 includes, for example, an optical lens unit, a diaphragm/zoom/focus controlling optical system, and an image sensor capable of converting light guided via the optical lens unit into an electric video signal. In general, the image sensor is a Complementary Metal Oxide Semiconductor (CMOS) Image Sensor or a Charge Coupled Device (CCD) Image Sensor. The control unit A101 controls the imaging unit A102 in the following manner. Specifically, the control unit A101 causes the image sensor to convert imaging target light focused by a lens, which is provided in the imaging unit A102, into an electric signal. The imaging unit A102 performs noise reduction processing on the acquired signal and outputs image data (digital data). The digital camera A100 according to the present exemplary embodiment records the image data on a recording medium A110 in compliance with Design rule for Camera File system (DCF) standards.

A nonvolatile memory A103 is an electrically erasable and recordable nonvolatile memory, which stores programs that can be performed by the control unit A101.

A work memory A104 can be used as a buffer memory for temporarily holding image data captured by the imaging unit A102, an image display memory for a display unit A106, or a work area for the control unit A101.

An operation unit A105 can receive an instruction from a user when the user operates the digital camera A100. The operation unit A105, for example, includes a power source button that allows a user to instruct ON/OFF of a power source of the digital camera A100, a release switch that allows a user to instruct a shooting operation, and a reproduction button that allows a user to instruct reproduction of image data. Further, the operation unit A105 includes operation members, such as a connection button dedicated to start communications with an external device via a connection unit A111 described below. Further, the operation unit A105 includes a touch panel integrally formed with the display unit A106.

The display unit A106 can display a live view image in a preparation stage of a still image, can display data of a captured still image, and can display characters to allow a user to perform an interactive operation. However, it is unnecessary for the digital camera A100 to incorporate the display unit A106. The digital camera A100 can connect not only with the display unit A106 provided on a back surface of the camera but also with the externally provided display unit A106. The digital camera A100 is at least required to have a display control function of controlling display contents of the display unit A106.

The recording medium A110 can record image data output from the imaging unit A102. The recording medium A110 can be constituted to be detachable from the digital camera A100 or can be incorporated in the digital camera A100. More specifically, the digital camera A100 includes at least a unit configured to access the recording medium A110.

The connection unit A111 is an interface that connects the control unit A101 to an external apparatus. The digital camera A100 according to the present exemplary embodiment can transmit and receive data to and from each external apparatus via the connection unit A111. In the present exemplary embodiment, the connection unit A111 includes an interface that can communicate with the external apparatus via wireless LAN connection in compliance with IEEE802.11 standards. The control unit A101 can control the connection unit A111 in such a way as to realize wireless communications with the external apparatus.

A short-range wireless communication unit A112, for example, includes an antenna dedicated to wireless communications, a modulation/demodulation circuit capable of processing wireless signals, and a communication controller. The short-range wireless communication unit A112 can output a modulated wireless signal via the antenna, and can demodulate a wireless signal received via the antenna in such a way as to realize short-range wireless communications in compliance with IEEE802.15 standards (i.e., Bluetooth (registered trademark) standards). The Bluetooth (registered trademark) communication employed in the present exemplary embodiment is version 4.0 of Bluetooth (registered trademark) Low Energy, which is low in electric power consumption. The Bluetooth (registered trademark) communication is inferior to wireless LAN communication in that the communicable range is narrow (i.e., the communicable distance is short). Further, the Bluetooth (registered trademark) communication is slow in communication speed compared to the wireless LAN communication. On the other hand, the Bluetooth (registered trademark) communication is low in electric power consumption compared to the wireless LAN communication.

The digital camera A100 has the characteristic configuration described above.

Next, a smartphone B100 will be described in detail below.

A control unit B101 can control each unit of the smartphone B100 according to an input signal or a program described below. However, the control unit B101 can be replaced by a plurality of hardware devices that can cooperatively perform processing for controlling the entire apparatus.

An imaging unit B102 includes, for example, an optical lens unit, a diaphragm/zoom/focus controlling optical system, and an image sensor capable of converting light guided via the optical lens unit into an electric video signal. In general, a CMOS or CCD image sensor is usable. The control unit B101 controls the imaging unit B102 in the following manner. Specifically, the control unit B101 causes the image sensor to convert imaging target light focused by a lens, which is provided in the imaging unit B102, into an electric signal. The imaging unit B102 performs noise reduction processing on the acquired signal and outputs image data (digital data). The smartphone B100 according to the present exemplary embodiment records the image data on a recording medium B110 in compliance with the DCF standards.

A nonvolatile memory B103 is an electrically erasable and recordable nonvolatile memory, which stores programs that can be performed by the control unit B101.

A work memory B104 can be used as a buffer memory for temporarily holding image data captured by the imaging unit B102, an image display memory for a display unit B106, or a work area for the control unit B101.

An operation unit B105 can receive an instruction from a user when the user operates the smartphone B100. The operation unit B105, for example, includes a power source button that allows a user to instruct ON/OFF of a power source of the smartphone B100 and an operation button that allows a user to instruct a screen transition. Further, the operation unit B105 includes a touch panel integrally formed with the display unit B106.

The display unit B106 can display data of a captured still image and can display a Graphical User Interface (GUI) that allows a user to perform an interactive operation. However, it is unnecessary for the smartphone B100 to incorporate the display unit B106. The smartphone B100 is at least required to have a display control function of controlling display contents.

The recording medium B110 can record image data output from the imaging unit B102. The recording medium B110 can be constituted to be detachable from the smartphone B100 or can be incorporated in the smartphone B100. More specifically, the smartphone B100 is at least required to include a unit configured to access the recording medium B110.

A connection unit B111 is an interface for connecting the control unit B101 to an external apparatus. The smartphone B100 according to the present exemplary embodiment can transmit and receive data to and from each external apparatus via the connection unit B111. In the present exemplary embodiment, the connection unit B111 includes an interface for communicating with the external apparatus via wireless LAN connection in compliance with the IEEE802.11 standards. The control unit B101 controls the connection unit B111 to realize wireless communications with the external apparatus.

A short-range wireless communication unit B112, for example, includes an antenna dedicated to wireless communications, a modulation/demodulation circuit capable of processing wireless signals, and a communication controller. The short-range wireless communication unit B112 can output a modulated wireless signal via the antenna and can demodulate a wireless signal received via the antenna to realize short-range communications in compliance with the IEEE802.15 standards (i.e., Bluetooth (registered trademark) standards). The Bluetooth (registered trademark) communication employed in the present exemplary embodiment is version 4.0 of Bluetooth (registered trademark) Low Energy, which is low in electric power consumption. The Bluetooth (registered trademark) communication is characteristically different from the wireless LAN communication as mentioned in the description of the digital camera A100.

A public wireless communication unit B113 is an interface fort realizing communications using a public network D100 via a base station C100. The public wireless communication unit B113 includes an antenna dedicated to wireless communications, a modulation/demodulation circuit capable of processing wireless signals, and a communication controller. The public wireless communication unit B113 can realize public wireless communications in compliance with Wideband Code Division Multiple Access (W-CDMA (UMTS)) or Long Term Evolution (LTE) standards.

The smartphone B100 has the characteristic configuration described above.

In FIG. 1, the digital camera A100 and the smartphone B100 can communicate with each other in a one-to-one relationship. However, the digital camera A100 can communicate with two or more smartphones in a one-to-many relationship.

<Schematic System Configuration>

Next, the communication system according to the present exemplary embodiment is schematically described below with reference to FIGS. 2A, 2B, 2C, and 2D, FIG. 3, and FIG. 4.

FIGS. 2A, 2B, 2C, and 2D are GUI screens that can be displayed on the digital camera or the smartphone to realize the communication system according to the present exemplary embodiment. The GUI screens illustrated in FIGS. 2A to 2C can be displayed on the display unit A106 of the digital camera A100. The GUI screen illustrated in FIG. 2D can be displayed on the display unit B106 of the smartphone B100.

FIG. 3A is a schematic diagram illustrating a list of information about other smartphones, held by the smartphone B100. The list illustrated in FIG. 3A stores information about contact addresses, which may be referred to as a telephone directory. In the following description, the list illustrated in FIG. 3A is referred to as a contact address list 300.

The information recorded in the contact address list 300 includes, at least, a device name 301, a user name 302, and a telephone number 303. The contact address list 300 is stored in the nonvolatile memory A103. The smartphone B100 updates the contact address list 300 when information is input and a registration operation is received via the operation unit B105.

Further, the smartphone according to the present exemplary embodiment holds a pairing device list 310 illustrated in FIG. 3B in addition to the contact address list 300 illustrated in FIG. 3B. Compared to the contact address list 300 that holds the information about other smartphones, the pairing device list 310 is characterized by holding information about a camera, a tablet PC, and any other devices to which no telephone number is allocated. However, information about a device to which a unique telephone number is allocated can be added to the pairing device list 310. In other words, the pairing device list 310 can hold information about a device already registered in the contact address list 300. The information recorded in the pairing device list 310 includes, at least, device name 301 and Bluetooth (registered trademark) device address (BD address) 311. The pairing device list 310 is stored in the nonvolatile memory B103. The smartphone B100 updates the pairing device list 310 each time when the smartphone B100 is paired with other device in compliance with Bluetooth (registered trademark) standards.

FIG. 4 is a sequence diagram illustrating a flow of processing (including device search and image transmission) that can be performed by the communication system according to the present exemplary embodiment. A digital camera 401 has a configuration similar to that of the digital camera A100. Each of smartphones 402 to 404 has a configuration similar to that of the smartphone B100. In the following description, reference numerals allocated to constituent components of respective apparatuses are similar to those used in FIG. 1. Further, dotted arrows illustrated in FIG. 4 represent communications via Bluetooth (registered trademark) connection and bold arrows illustrated in FIG. 4 represents communications via wireless LAN connection. Bluetooth (registered trademark) and wireless LAN functions of the digital camera and respective smartphones are switchable between valid and invalid based on a user operation. Further, it is assumed that the sequential processing illustrated in FIG. 4 can be started in a state where both of the Bluetooth (registered trademark) and wireless LAN functions are set to be valid in each device (i.e., the digital camera and the smartphones).

The digital camera 401 is activated upon pressing of the reproduction button that can be received via the operation unit A105. The activated digital camera 401 causes the display unit A106 to display, for example, a reproduction screen 200 illustrated in FIG. 2A. A captured image recorded in the storage medium A110 can be displayed on the reproduction screen 200. Further, a sharing icon 201 is superimposed on the displayed image.

The digital camera 401 starts the sequential processing illustrated in FIG. 4 when a user clicks the sharing icon 201 on the touch panel of the operation unit A105.

First, in step S411, the digital camera 401 broadcasts a search request (i.e., an advertisement) to surrounding devices via the Bluetooth (registered trademark) connection. In this case, information (e.g., the device name 301) about own device is added to the search request to be transmitted by the digital camera 401.

If the smartphones 402 to 404 receive the search request in step S411, then in step S412, each of respective smartphones 402 to 404 determines whether the digital camera 401 is already registered in the contact address list 300 or the pairing device list 310. Collation processing to be performed in step S412 will be described in detail below in steps S602 and S604 illustrated in FIG. 6.

In the following description, it is assumed that the digital camera 401 is already registered in the pairing device list 310 of the smartphone 402, and is not yet registered in the contact address list 300 and the pairing device list 310 of the smartphones 403 and 404. In this case, in response to the advertisement transmitted from the digital camera 401 in step S411, only the smartphone 402 transmits a response.

In step S413, the smartphone 402 transmits a search response to the digital camera 401 via the Bluetooth (registered trademark) connection. In this case, information (e.g., the device name 301 and the user name 302) about own device is added to the search response to be transmitted by the smartphone 402.

Figure 2B:
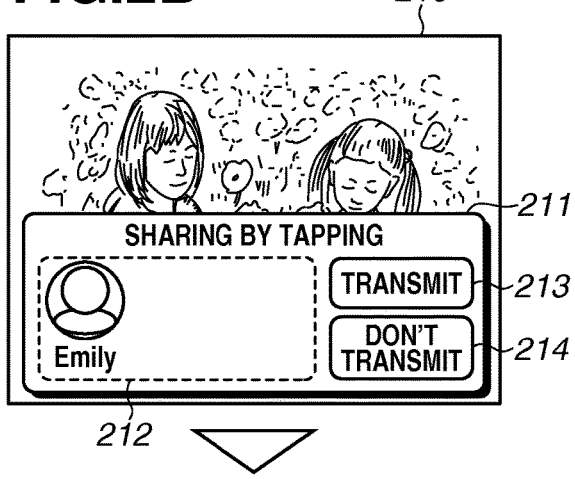

If the digital camera 401 receives the search response from the smartphone 402, then in step S414, the digital camera 401 causes the display unit A106 to display a transmission confirmation screen 210 illustrated in FIG. 2B. In this case, the digital camera 401 displays a dialog box 211 together with the photographic image recorded in the storage medium A110. The dialog box 211 is superimposed on the displayed image of the transmission confirmation screen 210 to allow a user to select a device to which the image should be transmitted. The digital camera 401 displays a transmission destination list 212, a transmission permission icon 213, and a transmission rejection icon 214 in the dialog box 211. The transmission destination list 212 can be displayed based on the information added to the search response in step S413. More specifically, according to the example illustrated in FIG. 2B, the search response is returned from the smartphone owned by Emily. Therefore, a list of transmission destination devices is formed using a character string of the user name "Emily" added to the search response.

Further, the smartphone 402 confirms whether the digital camera 401 is already registered in the pairing device list 310 of the smartphone 402. If it is determined that the digital camera 401 is already registered in the pairing device list 310 after completing the processing in step S413, then in step S415, the smartphone 402 broadcasts a search request to surrounding devices via the Bluetooth (registered trademark) connection. In this case, information (e.g., the device name 301) about own device is added to the search request to be transmitted by the smartphone 402.

If the smartphones 403 and 404 receive the search request in step S415, then in step S416, each of the smartphones 403 and 404 determines whether the smartphone 402 is already registered in the contact address list 300 or the pairing device list 310.

In the following description, it is assumed that the smartphone 402 is already registered in the contact address list 300 of respective smartphones 403 and 404. In this case, each of the smartphones 403 and 404 transmits a response to the smartphone 402. In this case, the search request from the smartphone 402 can be also received by the digital camera 401 because the way of transmitting the search request from the smartphone 402 is broadcasting. However, the illustrated sequential processing is started when the digital camera 401 transmits an image. Therefore, the digital camera 401 returns no response in response to the search request from the smartphone 402 (i.e., a registration destination of the digital camera 401). On the other hand, in a case where the transmission of the search request from the smartphone 402 is triggered by a user operation of the smartphone 402, the digital camera 401 can transmit a response. Alternatively, in a case where the digital camera 401 is configured to perform image transmission only, the digital camera 401 does not accept or respond to any search request from another device. For example, in discriminating whether the search request from the smartphone 402 is triggered by the search request from the digital camera 401 or triggered by the user operation of the smartphone 402, the following procedure is employable. Specifically, if the search request is received within a predetermined time since the transmission of the search request in step S411, the digital camera 401 can determine that the received search request is the search request broadcasted in step S415.

In step S417, each of the smartphones 403 and 404 transmits a search response to the smartphone 402 via the Bluetooth (registered trademark) connection. In this case, information (e.g., the device name 301, the user name 302, and the BD address 311) about own device is added to the search response to be transmitted from respective smartphones 403 and 404.

If the smartphone 402 receives the search response in step S417, then in step S418, the smartphone 402 transmits a substitutional search response to the digital camera 401 via the Bluetooth (registered trademark) connection. In this case, the information added in the search response in step S417 (e.g., the device name 301, the user name 302, and the BD address 311 about respective smartphones 403 and 404) is added to the substitutional search response to be transmitted from the smartphone 402. In this case, the smartphone 402 can transmit a single substitutional search response that includes all device information about the smartphones 403 and 404. Alternatively, it is feasible to separately transmit a substitutional search response for each of the smartphones 403 and 404. Through the above-described processing, the digital camera 401 can receive communication parameters ((e.g., BD addresses) necessary in communicating with the smartphones 403 and 404 via the smartphone 402 even when the digital camera 401 is not yet registered in the contact address lists of respective smartphones 403 and 404.

Figure 2C:
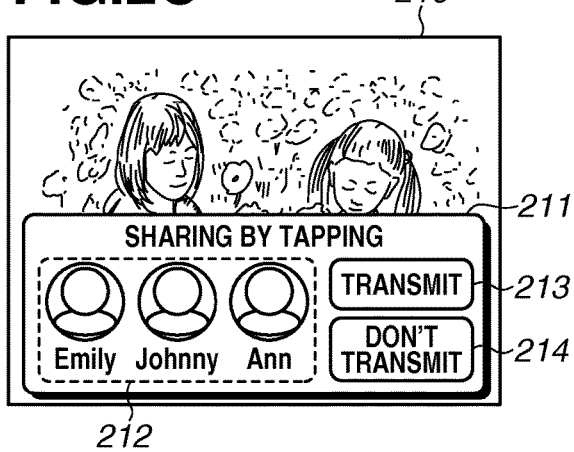

If the digital camera 401 receives the substitutional search response in step S418, then in step S419, the digital camera 401 causes the display unit A106 to display a transmission confirmation screen 210 illustrated in FIG. 2C. In the present exemplary embodiment, the digital camera 401 updates the transmission destination list 212 with reference to the information added to the search response in step S418. Thus, an icon indicating the transmission destination "Emily" that has been already registered when a user of the digital camera 401 intended to share can be immediately displayed. Subsequently, new icons indicating transmission destinations of "Johnny" and "Ann" are displayed based on the information from the smartphones 403 and 404 that has been already registered by the smartphone 402 owned by Emily. The screen illustrated in FIG. 2C can be automatically displayed without requiring the user to perform any special operation.

In step S420, if at least one image transmission destination device is selected from the transmission destination list 212 and the transmission permission icon 213 is clicked, then in step S421, the digital camera 401 transmits an image transmission request to the selected device via the Bluetooth (registered trademark) connection. In this case, acquisition of the BD addresses of the smartphones 403 and 404 by the digital camera 401 is already completed. Therefore, the digital camera 401 directly transmits the image transmission request to respective smartphones 403 and 404, without relying on the smartphone 402, with reference to the acquired BD address information. The image transmission request to be transmitted by the digital camera 401 in this case includes a reduced image (i.e., a thumbnail) of the captured image. On the other hand, if the transmission rejection icon 214 is clicked on the touch panel of the operation unit A105, the digital camera 401 terminates the processing of the present sequence and moves to the reproduction screen 200 again.

In the following description, it is assumed that the smartphone 403 has been selected in step S420. However, in step S420, selecting two or more devices as a plurality of image transmission destinations is also feasible. In such a case, the processing in step S421 and subsequent steps is performed for each of two or more devices.

Figure 2D:
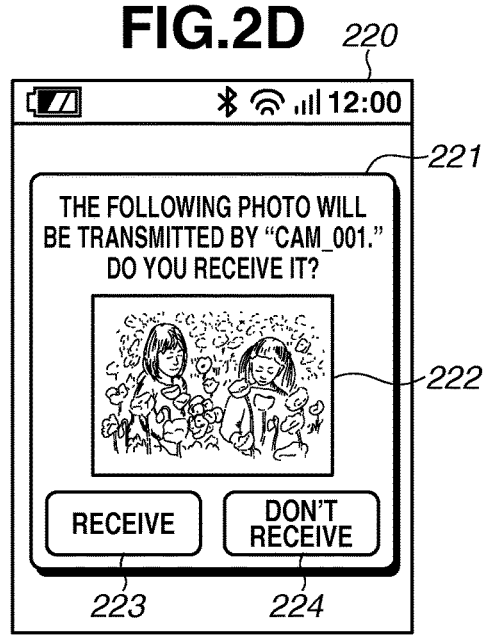
FIG. 2D illustrates a screen that can be displayed on the smartphone according to the first exemplary embodiment.

If the smartphone 403 receives the image transmission request, then in step S422, the smartphone 403 displays an image reception confirmation screen 220 illustrated in FIG. 2D. In this case, the smartphone 403 displays a dialog box 221 with a reduced image 222 added to the image transmission request in step S421. Thus, a user of the smartphone 403 can roughly confirm the content of the image that will be transmitted by the digital camera 401 by viewing the displayed reduced image 222. In step S423, if the smartphone 403 accepts the selection of a reception permission icon 223 via the touch panel of the operation unit B105, then in step S424, the smartphone 403 transmits an image transmission permission response to the digital camera 401 via the Bluetooth (registered trademark) connection. On the other hand, if the smartphone 403 accepts the selection of a reception rejection icon 224, the smartphone 403 transmits an image transmission rejection response to the digital camera 401 via the Bluetooth (registered trademark) connection, and terminates the processing of the present sequence.

If the digital camera 401 receives the image transmission permission response in step S424, then in step S425, the digital camera 401 shares communication parameters with the smartphone 403 via the Bluetooth (registered trademark) connection to perform wireless LAN communications.

Subsequently, in step S426, the digital camera 401 and the smartphone 403 establish a wireless LAN connection with each other based on the shared communication parameters. Even in a case where each smartphone has already participated in a network generated by an access point, the wireless LAN connection to be established in step S426 can be established without leaving from the currently belonging network.

Then, in step S427, the digital camera 401 transmits the captured image to the smartphone 403 via the wireless LAN connection.

If the image transmission in step S427 has been completed, then in step S428, the digital camera 401 and the smartphone 403 disconnect the wireless LAN communication. Even when the smartphone 403 has already participated in the network generated by the access point, the smartphone 403 disconnects the wireless LAN communication with the digital camera 401 without changing the network participation state.

As described above, a pairing completed smartphone can transmit a search request in place of the digital camera. Therefore, even when a smartphone has not yet registered the digital camera therein, the smartphone can perform wireless LAN communication with the digital camera. Further, it is feasible to reduce the amount of electric power consumption because a communication partner search operation is performed via the Bluetooth (registered trademark) connection, not via the wireless LAN connection. Further, it is feasible to realize smooth image transmission because the above-described image transmission is performed via the wireless LAN that is excellent in communication speed.

<Operation of Each Apparatus>

Subsequently, a detailed operation that can be performed by the digital camera to realize the procedure illustrated in FIG. 4 will be described in detail below with reference to FIG. 5.

Figure 5:
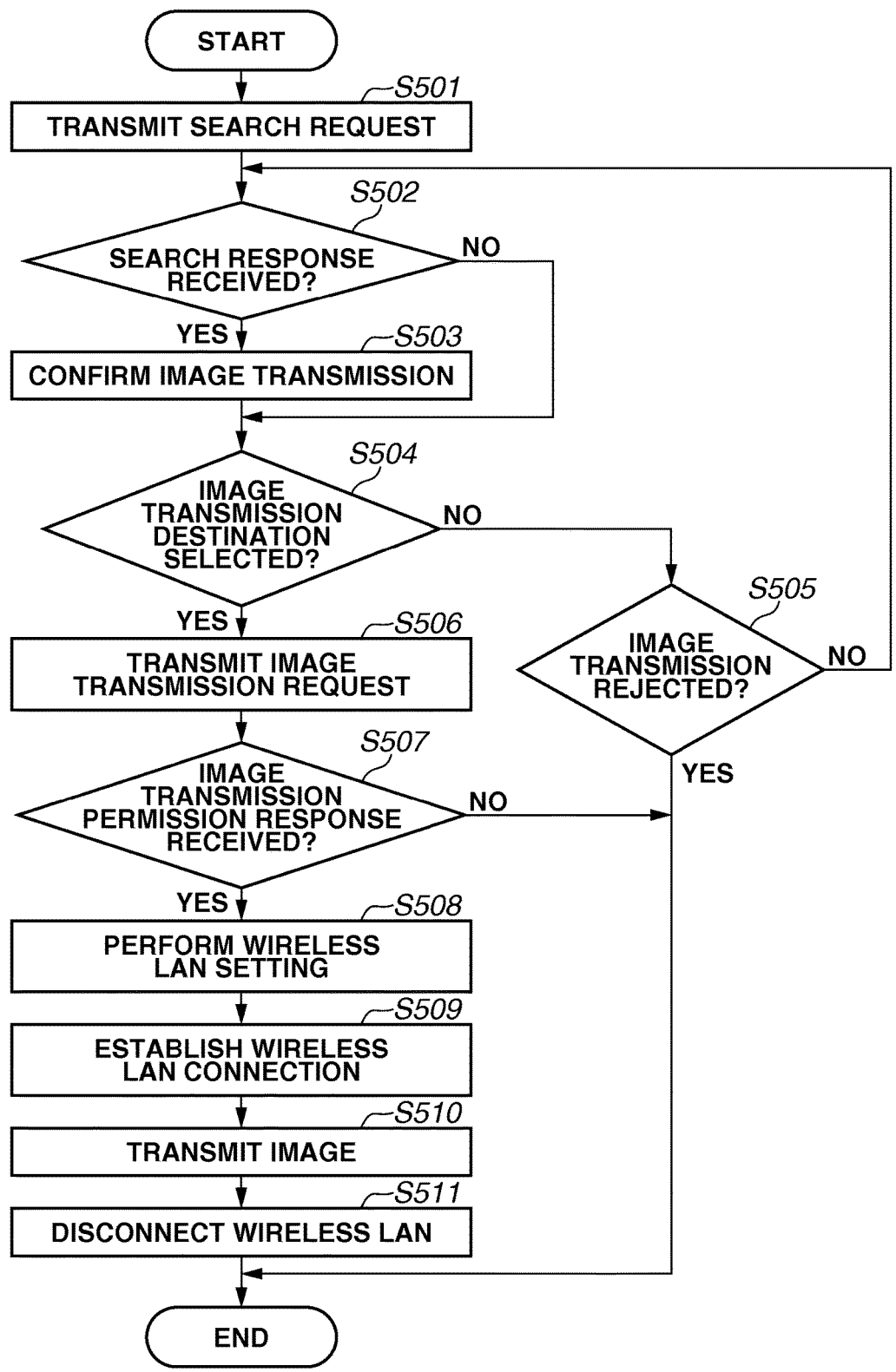
FIG. 5 is a flowchart illustrating an operation that can be performed by the digital camera according to the first exemplary embodiment.

FIG. 5 is a flowchart illustrating an operation that can be performed by the digital camera A100 according to the present exemplary embodiment. The processing of the flowchart illustrated in FIG. 5 can be realized when the control unit A101 of the digital camera A100 controls each unit of the digital camera A100 according to an input signal or a program. Unless otherwise noted, similar thing is applied to processing of each flowchart indicating an operation of the digital camera A100 in the following description.

The processing of the flowchart illustrated in FIG. 5 can be started when a user clicks the sharing icon 201 on the touch panel of the operation unit A105 in a state where the Bluetooth (registered trademark) and wireless LAN functions of the digital camera A100 are valid. Unless otherwise noted, similar thing is applied to processing of each flowchart indicating an operation of the digital camera A100 in the following description.

In step S501, the control unit A101 broadcasts a search request to surrounding devices via the short-range wireless communication unit A112. In this case, information (e.g., the device name 301 and the BD address 311) about own device is added to the search request to be transmitted by the control unit A101. The processing to be performed in step S501 corresponds to the processing performed in step S411 illustrated in FIG. 4.

In step S502, the control unit A101 determines whether there is any search response having been received from another device via the short-range wireless communication unit A112. If the control unit A101 determines that there is a search response having been received (YES in step S502), the operation proceeds to step S503. If the control unit A101 determines that there is not any search response having been received (NO in step S502), the operation proceeds to step S504.

In step S503, the control unit A101 causes the display unit A106 to display the transmission confirmation screen 210 (see FIGS. 2B and 2C). In this case, the control unit A101 controls the display unit A106 in such a way as to display the transmission destination list 212 in the dialog box 211, based on the information (e.g., the device name 301, the user name 302, and the BD address 311) added to the search response received in step S502. The processing to be performed in step S503 corresponds to the processing performed in steps S414 to S419 illustrated in FIG. 4.

In step S504, the control unit A101 determines whether an image transmission permitting operation has been accepted via the touch panel of the operation unit A105. If the control unit A101 determines that the transmission permission icon 213 has been clicked in a state where at least one image transmission destination device has been selected from the transmission destination list 212 via the touch panel of the operation unit A105 (YES in step S504), the operation proceeds to step S506. Otherwise (NO in step S504), the operation of the control unit A101 proceeds to step S505. In a case where there is not any displayed device on the transmission destination list 212 or in a case where there is not any displayed device having been selected, the control unit A101 can control the operation unit A105 and the display unit A106 in such a way as to prevent the transmission permission icon 213 from being selected. For example, it is useful that the display unit does not display the transmission permission icon 213. Alternatively, the display unit can perform a gray-out display of the transmission permission icon 213 to disregard any touch operation in a display area of the transmission permission icon 213.

In step S505, the control unit A101 determines whether the image transmission permitting operation has been accepted via the touch panel of the operation unit A105. If it is determined that the reception rejection icon 224 has been clicked on the touch panel of the operation unit A105 (YES in step S505), the control unit A101 terminates the processing of the flowchart illustrated in FIG. 5. Otherwise (NO in step S505), the operation returns to step S502 to repeat the above-described sequential processing in steps S502 to S505. As a result, first, the control unit A101 receives a response from a smartphone having been already registered. Subsequently, the control unit A101 receives a substitutional response from the smartphone having been already registered while repeating the above-described processing.

In step S506, the control unit A101 transmits an image transmission request to the device selected in step S504 via the short-range wireless communication unit A112. In this case, the image transmission request to be transmitted by the control unit A101 includes a reduced image of a captured image. The processing to be performed in step S506 corresponds to the processing performed in step S421 illustrated in FIG. 4.

In step S507, the control unit A101 determines whether image transmission has been permitted by the device to which the image transmission request has been transmitted in step S506. If the control unit A101 determines that an image transmission permission response has been received from the device via the short-range wireless communication unit A112 (YES in step S507), the operation proceeds to step S508. On the other hand, if it is determined that an image transmission rejection response has been received from the device via the short-range wireless communication unit A112 or if it is determined that the image transmission permission response has not been received within a predetermined time (NO in step S507), the control unit A101 terminates the processing of the flowchart illustrated in FIG. 5.

In step S508, the control unit A101 transmits and receives communication parameters required in wireless LAN communications via the connection unit A111, via the short-range wireless communication unit A112, to and from the image transmission destination device from which the image transmission permission response has been received in step S507. The processing to be performed in step S508 corresponds to the processing performed in step S425 illustrated in FIG. 4.

In step S509, the control unit A101 establishes a wireless LAN connection with the image transmission destination device via the connection unit A111 based on the communication parameters received in step S508. The processing to be performed in step S509 corresponds to the processing performed in step S426 illustrated in FIG. 4.

In step S510, the control unit A101 transmits the captured image to the image transmission destination device via the connection unit A111. The processing to be performed in step S510 corresponds to the processing performed in step S427 illustrated in FIG. 4.

In step S511, the control unit A101 disconnects the communication with the image transmission destination device via the connection unit A111. The processing to be performed in step S511 corresponds to the processing performed in step S428 illustrated in FIG. 4.

The digital camera A100 according to the present exemplary embodiment can perform the above-described sequential operations.

Subsequently, a detailed operation that can be performed by the smartphone to realize the above-described operations will be described in detail below with reference to FIG. 6.

Figure 6:
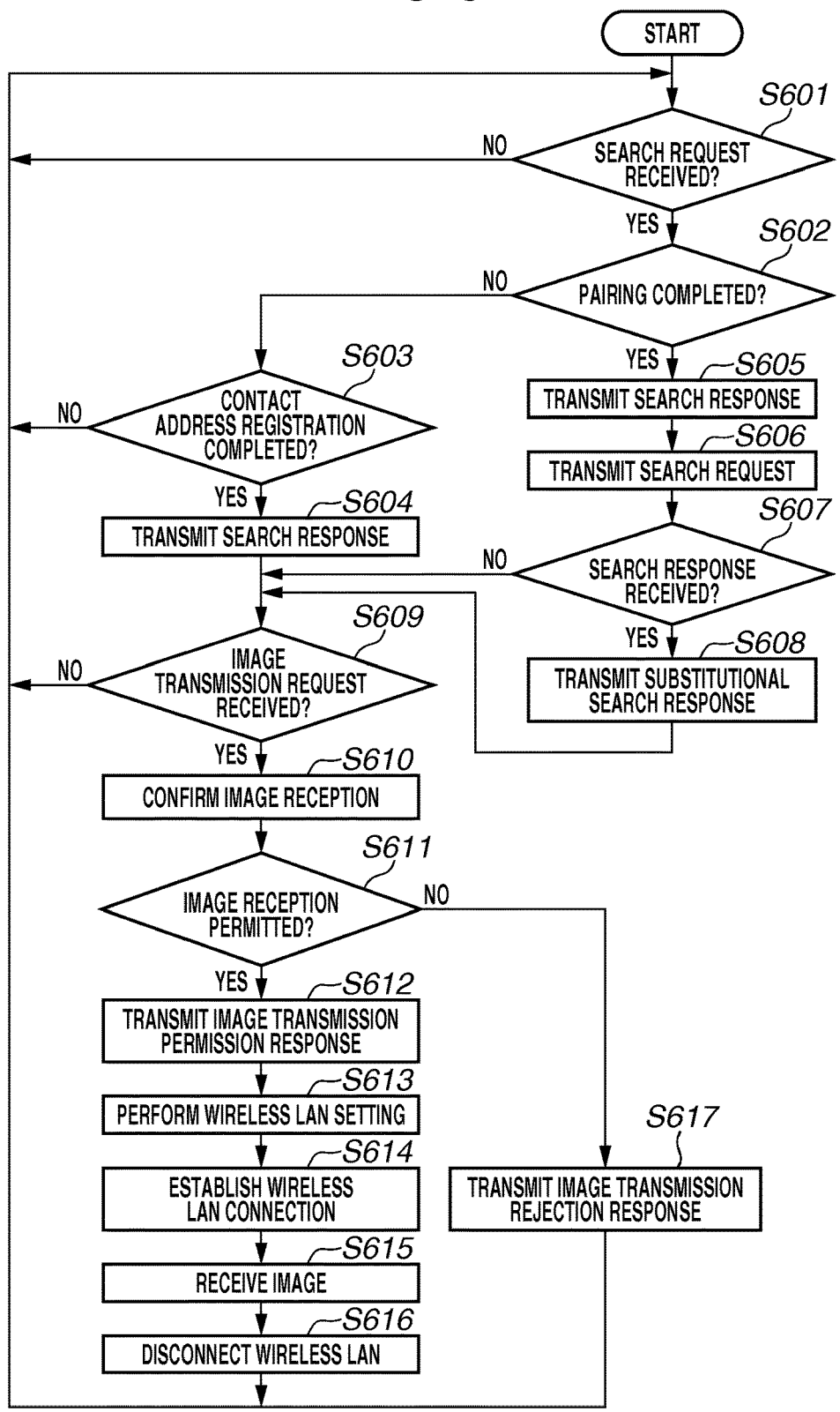
FIG. 6 is a flowchart illustrating an operation that can be performed by the smartphone according to the first exemplary embodiment.

FIG. 6 is a flowchart illustrating an operation that can be performed by the smartphone B100 according to the present exemplary embodiment. The processing of the flowchart illustrated in FIG. 6 can be realized when the control unit B101 of the smartphone B100 controls each unit of the smartphone B100 according to an input signal or a program. Unless otherwise noted, similar thing is applied to processing of each flowchart indicating an operation of the smartphone B100 in the following description.

The processing of the flowchart illustrated in FIG. 6 can be started when an operation for permitting reception of a search request is accepted via the operation unit B105. More specifically, for example, the operating system (OS) installed on the smartphone B100 responds to a menu operation by a user in such a way as to set the Bluetooth (registered trademark) and wireless LAN functions to be valid. Thus, the smartphone B100 is brought into a standby state to wait for reception of a search request from an external device and the flowchart illustrated in FIG. 6 can be started. Unless otherwise noted, similar thing is applied to processing of each flowchart indicating an operation of the smartphone B100 in the following description.

In step S601, the control unit B101 determines whether there is any search request having been received via the short-range wireless communication unit B112. If it is determined that there is not any search request having been received (NO in step S601), the control unit B101 repeats the above-described processing in step S601 to wait until a search request is received. On the other hand, if the control unit B101 determines that there is a search request having been received (YES in step S601), the operation proceeds to step S602.

In step S602, the control unit B101 determines whether the BD address 311 included in the search request is already registered in the pairing device list 310. If the control unit B101 determines that the BD address 311 is already registered in the pairing device list 310 (YES in step S602), the operation proceeds to step S605. On the other hand, if it is determined that the BD address is not yet registered in the pairing device list 310 (NO in step S602), the operation proceeds to step S603.

In step S603, the control unit B101 determines whether the device name 301 included in the search request is already registered in the contact address list 300. If the control unit B101 determines that the device name is already registered in the contact address list 300 (YES in step S603), the operation proceeds to step S604. On the other hand, if it is determined that the device name is not yet registered in the contact address list 300 (NO in step S603), it means that the pairing is not yet completed and the contact address registration is not yet completed. In this case, there is no necessity for the control unit B101 to respond to the request. Therefore, the control unit B101 does not return any response. The operation of the control unit B101 returns to step S601. The processing to be performed in steps S602 and S603 corresponds to the processing performed in step S412 illustrated in FIG. 4.

Subsequently, in step S604, the control unit B101 transmits a search response to an image transmission source device that has transmitted the search request via the short-range wireless communication unit B112. In this case, the control unit B101 identifies the image transmission source device with reference to the BD address 311 included in the search request received in step S601. In this case, the search response to be transmitted by the control unit B101 includes identification information (e.g., the device name 301, the user name 302, and the BD address 311) about own device. The processing to be performed in step S604 corresponds to the processing performed in step S417 illustrated in FIG. 4.

The processing performed in step S605 is similar to that in step S604. The control unit B101 transmits a search response to the image transmission source device that has transmitted the search request via the short-range wireless communication unit B112. The processing to be performed in step S605 corresponds to the processing performed in step S413 illustrated in FIG. 4.

In step S606, the control unit B101 broadcasts a search request to surrounding devices, instead of a pairing completed device, via the short-range wireless communication unit B112. In this case, the search request to be transmitted by the control unit B101 includes information (e.g., the device name 301 and the BD address 311) about own device. The processing to be performed in step S606 corresponds to the processing performed in step S415 illustrated in FIG. 4.

In step S607, the control unit B101 determines whether there is any search response having been received from at least one device via the short-range wireless communication unit B112. If the control unit B101 determines that at least one search response has been received (YES in step S607), the operation proceeds to step S608. If the control unit B101 determines that there is not any search response having been received (No in step S607), the operation proceeds to step S609. In this case, it is useful for the control unit B101 to repeat the above-described processing in step S607 for a predetermined time to receive search responses from two or more devices.

In step S608, the control unit B101 transmits a substitutional search response to the image transmission source device via the short-range wireless communication unit B112. The substitutional search response to be transmitted by the control unit B101 includes information (e.g., the device name 301, the user name 302, and the BD address 311) about respective devices included in at least one search response received in step S607. In this case, the control unit B101 can transmit a single substitutional search response that includes information about all devices or can separately transmit a substitutional search response for each device. The processing to be performed in step S608 corresponds to the processing performed in step S418 illustrated in FIG. 4.

In step S609, the control unit B101 determines whether the image transmission request has been received from the image transmission source device via the short-range wireless communication unit B112. If the control unit B101 determines that the image transmission request has been received within a predetermined time (YES in step S609), the operation proceeds to step S610. On the other hand, if it is determined that there is not any image transmission request having been received within the predetermined time (NO in step S609), the control unit B101 terminates the processing of the flowchart illustrated in FIG. 6.

In step S610, the control unit B101 causes the display unit B106 to display the image reception confirmation screen 220 illustrated in FIG. 2D. The control unit B101 controls the display unit B106 in such a way as to display the reduced image 222 added to the image transmission request in the dialog box 221. The processing to be performed in step S610 corresponds to the processing performed in step S422 illustrated in FIG. 4.

In step S611, the control unit B101 determines whether an image reception permitting operation has been accepted via the touch panel of the operation unit B105. If the control unit B101 determines that the reception permission icon 223 has been clicked on the touch panel of the operation unit B105 (YES in step S611), the operation proceeds to step S612. On the other hand, if the control unit B101 determines that the reception rejection icon 224 has been clicked (NO in step S611), the operation proceeds to step S617.

In step S612, the control unit B101 transmits an image transmission permission response to the image transmission source device via the short-range wireless communication unit B112. The processing to be performed in step S612 corresponds to the processing performed in step S424 illustrated in FIG. 4.

In step S613, the control unit B101 transmits and receives communication parameters required in wireless LAN communication via the connection unit B111, via the short-range wireless communication unit B112, to and from the image transmission source device. The processing to be performed in step S613 corresponds to the processing performed in step S425 illustrated in FIG. 4.

In step S614, the control unit B101 establishes a wireless LAN connection with the image transmission source device via the connection unit B111 based on the communication parameters transmitted and received in step S613. The processing to be performed in step S614 corresponds to the processing performed in step S426 illustrated in FIG. 4.

In step S615, the control unit B101 receives the captured image from the image transmission source device via the connection unit B111.

In step S616, the control unit B101 disconnects the communication with the image transmission source device via the connection unit B111. The processing to be performed in step S616 corresponds to the processing performed in step S428 illustrated in FIG. 4. Subsequently, the operation returns to step S601.

On the other hand, in step S617, the control unit B101 transmits an image transmission rejection response to the image transmission source device via the short-range wireless communication unit B112. Subsequently, the operation returns to step S601.

The control unit B101 terminates the processing of the flowchart illustrated in FIG. 6, for example, when the user invalidate either the Bluetooth (registered trademark) function or the wireless LAN function.

The smartphone B100 according to the present exemplary embodiment can perform the above-described sequential operations.

As described above, the smartphone B100 according to the present exemplary embodiment can search for surrounding devices in place of the digital camera. Therefore, it becomes feasible to receive a search response from a device that has not yet registered the digital camera therein.

<Schematic System Configuration>

In the first exemplary embodiment, the image transmission source device broadcasts the search request in the manner described above. On the other hand, in the present exemplary embodiment, the image transmission source device is configured to transmit a destination designated search request as described in detail below.

Further, in the first exemplary embodiment, the image transmission source device and the image transmission destination device directly share the wireless LAN settings. On the other hand, in the present exemplary embodiment, a pairing completed device mediates the wireless LAN setting as described in detail below.

The present exemplary embodiment is similar to the first exemplary embodiment. Therefore, characteristic features of the present exemplary embodiment will be described mainly.

A communication system according to the present exemplary embodiment is schematically described in detail below with reference to FIGS. 7 and 8.

FIG. 7 illustrates an example of information to be referred to in determining a device to which the digital camera A100 transmits a search request, to realize the communication system according to the present exemplary embodiment.

The information recorded in the pairing device list 700 includes, at least, the device name 301 and the BD address 311. The pairing device list 700 is stored in the nonvolatile memory A103. The digital camera A100 updates the pairing device list 700 when pairing with other device is performed in compliance with the Bluetooth (registered trademark) standards.

Figure 8:
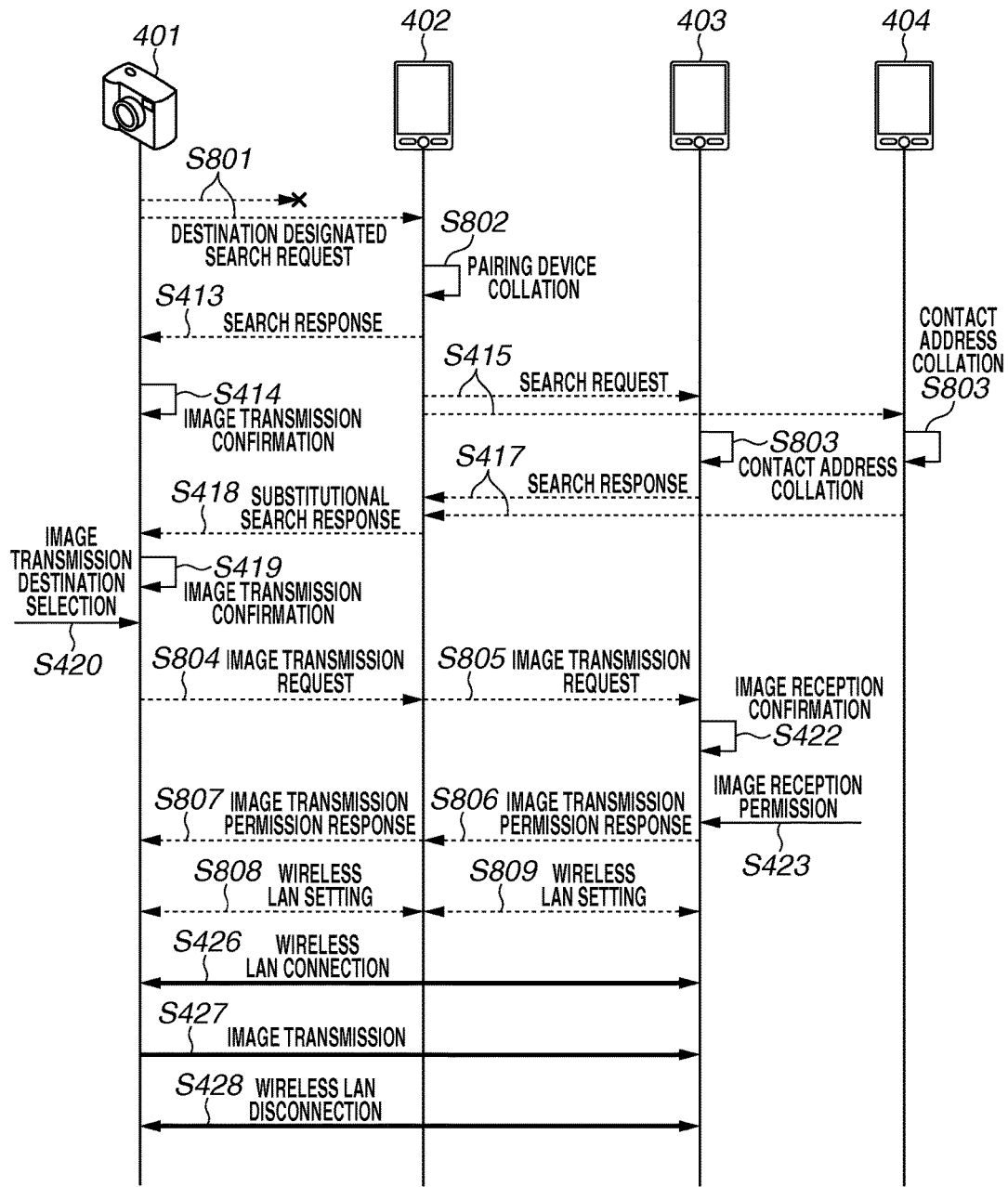
FIG. 8 is a sequence diagram illustrating a schematic procedure of communications that can be performed between the digital camera and the smartphone according to the second exemplary embodiment.

FIG. 8 is a sequence diagram illustrating a flow of processing (including device search and image transmission) that can be performed by the communication system according to the present exemplary embodiment. It is assumed that the sequential processing illustrated in FIG. 8 can be started in a state where both of the Bluetooth (registered trademark) and wireless LAN functions are set to be valid in each device. Steps similar to those illustrated in FIG. 4 are denoted by the same reference numerals and redundant description thereof will be avoided.

The digital camera 401 starts the sequential processing illustrated in FIG. 8 when a user clicks the sharing icon 201 illustrated in FIG. 2A on the touch panel of the operation unit A105.

First, in step S801, the digital camera 401 transmits a destination designated search request to one of the pairing completed devices via the Bluetooth (registered trademark) connection. In this case, the designated search request to be transmitted by the digital camera 401 includes information (e.g., the device name 301 and the BD address 311) about own device. If the digital camera 401 does not receive any search response replying to the designated search request within a predetermined time (see × mark in step S801), the digital camera 401 newly transmits a designated search request to another one of the pairing completed devices. The digital camera 401 repeats the above-described processing until a search response is received.

In the following description, it is assumed that the smartphone 402 responds to the designated search request.

If the smartphone 402 receives the destination designated search request in step S801, then in step S802, the smartphone 402 determines whether the digital camera 401 is already registered in the pairing device list 310.

In the following description, it is assumed that the digital camera 401 is already registered in the pairing device list 310 of the smartphone 402.

After the processing in step S802 has been completed, the digital camera 401 and the smartphone 402 perform processing similar to that in steps S413 to S415 illustrated in FIG. 4.

If the smartphones 403 and 404 receive the search request S415, then in step S803, each of the smartphones 403 and 404 determines whether the smartphone 402 is already registered in the contact address list 300.

In the following description, it is assumed that the smartphone 402 is already registered in the contact address list 300 of respective smartphones 403 and 404.

After the processing in step S803 has been completed, the digital camera 401 and the smartphones 402 to 404 perform processing similar to that in steps S417 to S419 illustrated FIG. 4.

If, in step S420, at least one image transmission destination device is selected from the transmission destination list 212 and the transmission permission icon 213 is clicked, then in step S804, the digital camera 401 transmits an image transmission request to the smartphone 402 via the Bluetooth (registered trademark) connection. In this case, the image transmission request to be transmitted by the digital camera 401 includes a reduced image of a captured image and the BD address 311 of the digital camera 401 (i.e., the image transmission destination). On the other hand, if the transmission rejection icon 214 is clicked on the touch panel of the operation unit A105 operation, the digital camera 401 terminates the processing of the present sequence and moves to the reproduction screen 200 again.

In the following description, it is assumed that the smartphone 403 has been selected in step S420. However, in step S420, selecting two or more devices as a plurality of image transmission destinations is also feasible. In such a case, the processing in step S804 and subsequent steps is performed for each of two or more devices.

If the smartphone 402 receives the image transmission request in step S804, then in step S805, the smartphone 402 transmits an image transmission request to the smartphone 403 via the Bluetooth (registered trademark) connection. In this case, the image transmission request in step S805 to be transmitted by the smartphone 402 includes the reduced image of the captured image added to the image transmission request in step S804.

If the smartphone 403 receives the image transmission request S805, the smartphone 403 performs processing similar to that in step S422.

If, in step S423, the reception permission icon 223 is clicked on the touch panel of the operation unit B105, then in step S806, the smartphone 403 transmits an image transmission permission response to the smartphone 402 via the Bluetooth (registered trademark) connection. In this case, the image transmission permission response in step S806 to be transmitted by the smartphone 403 includes the BD address 311 of the digital camera 401 (i.e., the image transmission source). On the other hand, if the reception rejection icon 224 is clicked, the smartphone 403 transmits an image transmission rejection response to the digital camera 401 via the Bluetooth (registered trademark) connection and terminates the processing of the present sequence.

If the smartphone 402 receives the image transmission permission response S806, then in step S807, the smartphone 402 transmits an image transmission permission response to the digital camera 401 via the Bluetooth (registered trademark) connection.

If the digital camera 401 receives the image transmission permission response in step S807, then in steps S808 and S809, the digital camera 401 and the smartphone 403 share communication parameters via the Bluetooth (registered trademark) connection to perform wireless LAN communications with each other. The smartphone 402 mediates communications via the Bluetooth (registered trademark) connection to realize the above-described sharing of the parameters.

Subsequently, the digital camera 401 and the smartphone 403 perform processing similar to that in steps S426 to S428 illustrated in FIG. 4.

<Operation of Each Apparatus>

Subsequently, a detailed operation that can be performed by the digital camera to realize the above-described operation will be described in detail below with reference to FIG. 9. Steps similar to those illustrated in FIG. 5 are denoted by the same reference numerals and redundant description thereof will be avoided.

Figure 9:
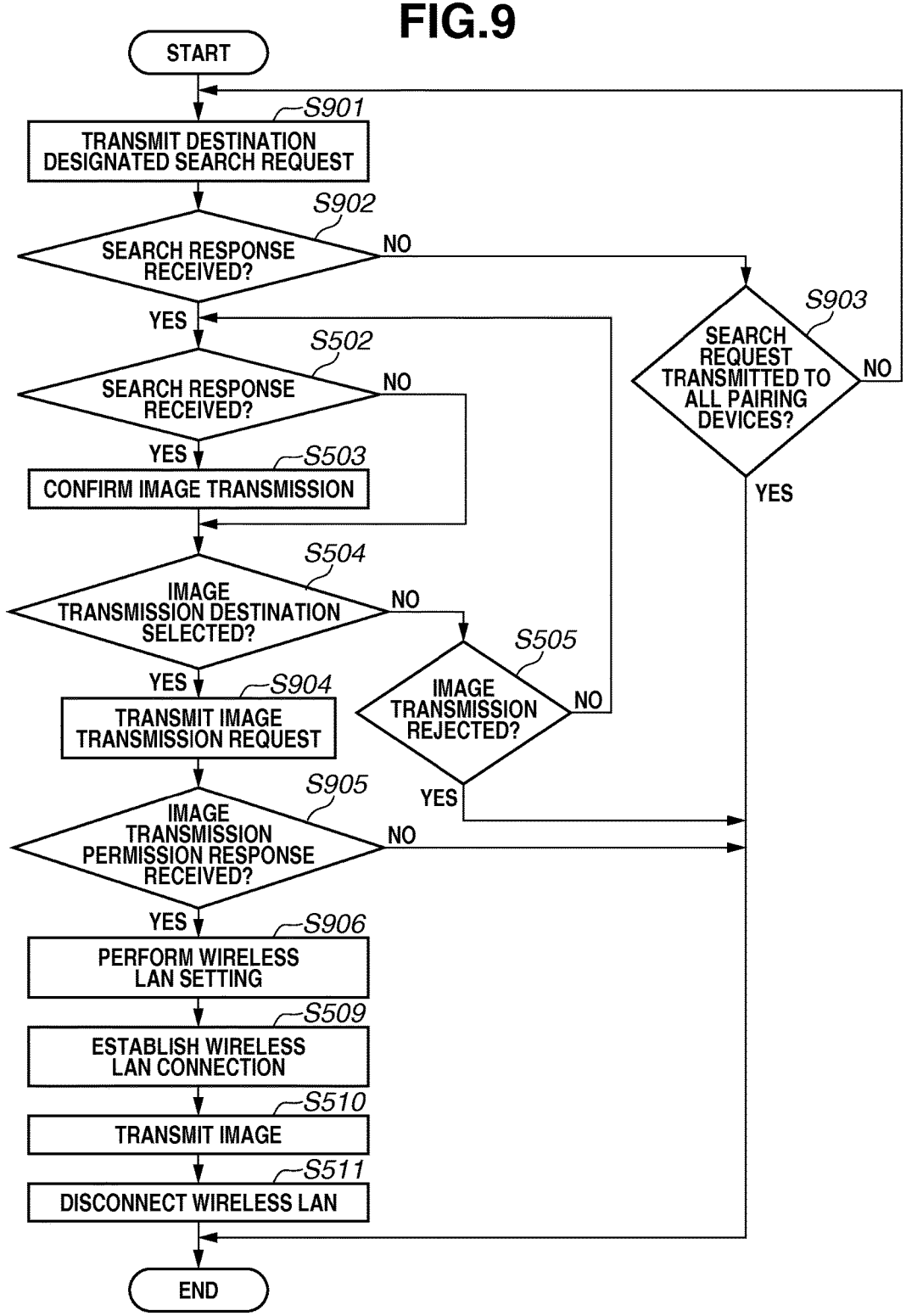
FIG. 9 is a flowchart illustrating an operation that can be performed by the digital camera according to the second exemplary embodiment.

FIG. 9 is a flowchart illustrating processing that can be performed by the digital camera A100 according to the present exemplary embodiment.

In step S901, the control unit A101 selects one of devices stored in the pairing device list 700, to which no search request has been transmitted, and transmits a search request to the selected device via the short-range wireless communication unit A112. The search request to be transmitted by the control unit A101 includes information (e.g., the device name 301 and the BD address 311) about own device. Further, the control unit A101 stores information about the device to which the search request has been transmitted, in the work memory A104. The processing to be performed in step S901 corresponds to the processing performed in step S801 illustrated in FIG. 8.

In step S902, the control unit A101 determines whether a response replying to the search request transmitted in step S901 has been received via the short-range wireless communication unit A112. If the control unit A101 determines that there is a search response having been received (YES in step S902), the operation proceeds to step S502. If the control unit A101 determines that no search response has been received (NO in step S902), the operation proceeds to step S903.

In step S903, the control unit A101 determines whether the search request in step S901 has been transmitted to all devices stored in the pairing device list 700. If it is determined the search request has been transmitted to all pairing devices (YES in step S903), the control unit A101 terminates the processing of the flowchart illustrated in FIG. 9. Otherwise (NO in step S903), the operation of the control unit A101 returns to step S901.

In step S504, the control unit A101 determines whether an image transmission permitting operation has been accepted via the touch panel of the operation unit A105. If the control unit A101 determines that the transmission permission icon 213 has been clicked on the touch panel of the operation unit A105 in a state where at least one image transmission destination device is selected from the transmission destination list 212 (YES in step S504), the operation proceeds step S904. Otherwise (NO in step S504), the operation of the control unit A101 proceeds to step S505.

In step S904, the control unit A101 transmits an image transmission request to a device that has received the search response in step S902 via the short-range wireless communication unit A112. The image transmission request to be transmitted by the control unit A101 includes a reduced image of a captured image and the BD address 311 of the image transmission destination device selected in step S504. The processing to be performed in this step corresponds to the processing performed in step S804 illustrated in FIG. 8.

In step S905, the control unit A101 determines whether image transmission has been permitted by the device to which the image transmission request has been transmitted in step S506. If the control unit A101 determines that an image transmission permission response has been received from the device that has received the search response in step S902 via the short-range wireless communication unit A112 (YES in step S905), the operation proceeds to step S906. On the other hand, if it is determined that an image transmission rejection response has been received from the device via the short-range wireless communication unit A112 or if it is determined that the image transmission permission response has not been received within a predetermined time (NO in step S905), the control unit A101 terminates the processing of the flowchart illustrated in FIG. 9.

In step S906, the control unit A101 transmits and receives communication parameters required in wireless LAN communications with the image transmission destination device via the connection unit A111, via the short-range wireless communication unit A112, to and from the device that has received the search response in step S902. The processing to be performed in step S906 corresponds to the processing performed in step S808 illustrated in FIG. 8.

The digital camera A100 according to the present exemplary embodiment can perform the above-described sequential operations.

Subsequently, a detailed operation that can be performed by the smartphone to realize the above-described operation will be described in detail below with reference to FIG. 10. Steps similar to those illustrated in FIG. 6 are denoted by the same reference numerals and redundant description thereof will be avoided.

Figure 10:
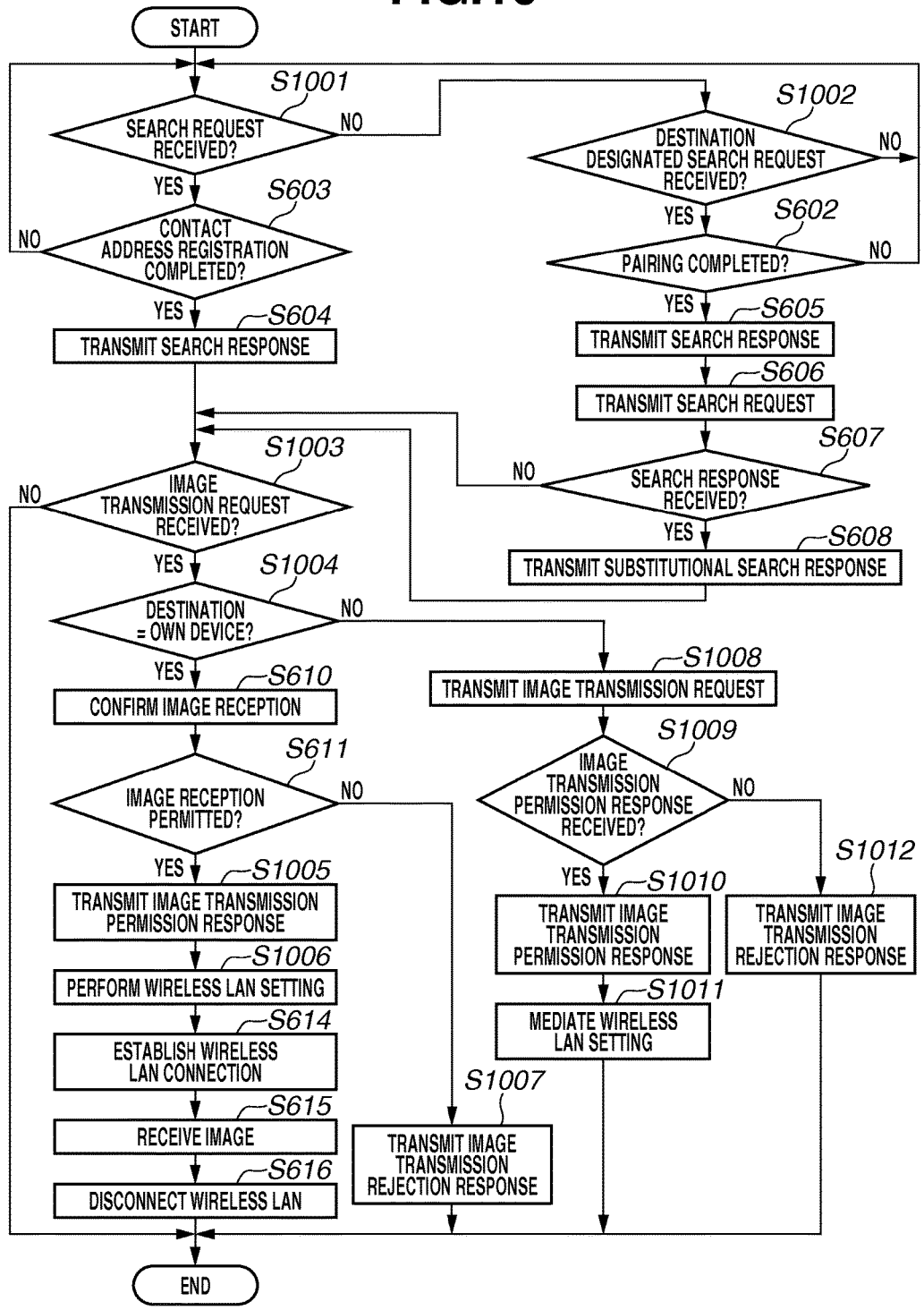
FIG. 10 is a flowchart illustrating an operation that can be performed by the smartphone according to the second exemplary embodiment.

FIG. 10 is a flowchart illustrating processing that can be performed by the smartphone B100 according to the present exemplary embodiment.

In step S1001, the control unit B101 determines whether a search request that does not designate a destination has been received via the short-range wireless communication unit B112. If the control unit B101 determines that the search request has been received (YES in step S1001), the operation proceeds to step S603. If it is determined that the search request has not been received (NO in step S1001), the operation proceeds to step S1002.

In step S1002, the control unit B101 determines whether a destination designated search request has been received via the short-range wireless communication unit B112. If the control unit B101 determines that the destination designated search request has been received (YES in step S1002), the operation proceeds to step S602. If it is determined that the destination designated search request has not been received (NO in step S1002), the operation returns to step S1001.

In step S1003, the control unit B101 determines whether an image transmission request has been received from another device via the short-range wireless communication unit B112. If the control unit B101 determines that the image transmission request has been received within a predetermined time (YES in step S1003), the operation proceeds to step S1004. On the other hand, if it is determined the image transmission request has not been received within the predetermined time (NO in step S1003), the control unit B101 terminates the processing of the flowchart illustrated in FIG. 10.

In step S1004, the control unit B101 determines whether the BD address 311 of the device being designated as the image transmission destination in the image transmission request received in step S1003 is own device. If the control unit B101 determines that the image transmission destination is own device (YES in step S1004), the operation proceeds to step S610. If the control unit B101 determines that the image transmission destination is not own device (NO in step S1004), the operation proceeds to step S1008.

In step S611, the control unit B101 determines whether an image reception permitting operation has been accepted via the touch panel of the operation unit B105. If the control unit B101 determines that the reception permission icon 223 has been clicked on the touch panel of the operation unit B105 (YES in step S611), the operation proceeds to step S1005. On the other hand, if the control unit B101 determines that the reception rejection icon 224 has been clicked (NO in step S611), the operation proceeds to step S1007.

In step S1005, the control unit B101 transmits an image transmission permission response to the transmission source device of the image transmission request received in step S1003 (hereinafter, referred to as a mediation device) via the short-range wireless communication unit B112. In this case, the image transmission permission response to be transmitted by the control unit B101 includes the BD address 311 of the image transmission source device. The processing to be performed in step S1005 corresponds to the processing performed in step S806 illustrated in FIG. 8.

In step S1006, the control unit B101 transmits and receives communication parameters required in performing wireless LAN communications with the image transmission source device via the connection unit B111, via the short-range wireless communication unit B112, to and from the mediation device. The processing to be performed in step S1006 corresponds to the processing performed in step S809 illustrated in FIG. 8. In step S614, the control unit B101 establishes a wireless LAN connection with the image transmission source device via the connection unit B111 based on the communication parameters transmitted and received in step S1006. The processing to be performed in step S614 corresponds to the processing performed in step S426 illustrated in FIG. 8.

In step S1007, the control unit B101 transmits an image transmission rejection response to the mediation device via the short-range wireless communication unit B112.

In step S1008, the control unit B101 transmits an image transmission request to the image transmission destination device via the short-range wireless communication unit B112. The image transmission request to be transmitted by the control unit B101 in step S1008 includes the reduced image of the captured image included in the image transmission request received in step S1003. The processing to be performed in step S1008 corresponds to the processing performed in step S805 illustrated in FIG. 8.

In step S1009, the control unit B101 determines whether the image transmission permission response has been received from the image transmission destination device via the short-range wireless communication unit B112. If the control unit B101 determines that the image transmission permission response has been received from the image transmission destination device (YES in step S1009), the operation proceeds to step S1010. On the other hand, if the control unit B101 determines that the image transmission rejection response has been received from the device via the short-range wireless communication unit B112 or if the control unit B101 determines that the image transmission permission response has been received within a predetermined time (NO in step S1009), the operation proceeds to step S1012.

In step S1010, the control unit B101 transmits an image transmission permission response to the image transmission source device via the short-range wireless communication unit B112. The processing to be performed in step S1010 corresponds to the processing performed in step S807 illustrated in FIG. 8.

In step S1011, the control unit B101 transmits and receives communication parameters, via the short-range wireless communication unit B112, to and from the image transmission source device and the image transmission destination device, to enable the image transmission source device and the image transmission destination device to perform wireless LAN communications via the connection unit B111. The processing to be performed in step S1011 corresponds to the processing performed in steps S808 and S809 illustrated in FIG. 8.

In step S1012, the control unit B101 transmits an image transmission rejection response to the image transmission source device via the short-range wireless communication unit B112.

The smartphone B100 according to the present exemplary embodiment can perform the above-described sequential operations.

As described above, the smartphone B100 according to the present exemplary embodiment can search for surrounding devices in place of the digital camera, and can mediate wireless LAN setting for the image transmission destination. Therefore, a device that has not yet registered the digital camera therein can communicate with the digital camera via the wireless LAN connection.

<Schematic System Configuration>

In the first exemplary embodiment, the substitutional search response from the smartphone 402 includes the information about the smartphones 403 and 404. Therefore, the image transmission source device can acquire the information about the smartphones 403 and 404, and issue the image transmission request based on the acquired information. On the contrary, in a third exemplary embodiment, the search request from the smartphone 402 includes information (e.g., the device name 301 and the BD address 311) about the image transmission source device as described in detail below, instead of adding the information about the smartphones 403 and 404 to the substitutional search response.

The present exemplary embodiment is similar to the first exemplary embodiment. Therefore, characteristic features of the present exemplary embodiment will be described mainly.

A communication system according to the present exemplary embodiment is schematically described below with reference to FIGS. 14 and 11.

Figure 14:
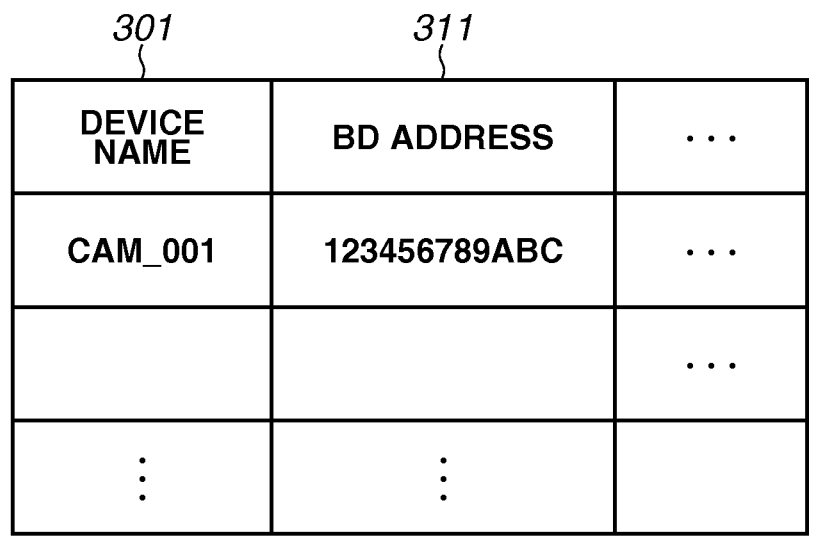
FIG. 14 is a schematic diagram illustrating a permission list that can be held by the smartphone according to the third exemplary embodiment.

FIG. 14 illustrates an example of information to be referred to in determining a device that the smartphone B100 permits the search request, to realize the communication system according to the present exemplary embodiment, in addition to the contact address list 300 and the pairing device list 310.

Information recorded in the permission list 1400 includes, at least, the device name 301 and the BD address 311. The permission list 1400 is stored in the nonvolatile memory B103. The smartphone B100 registers the permission list 1400 in step S1303 illustrated in FIG. 13 as described below.

Figure 11:
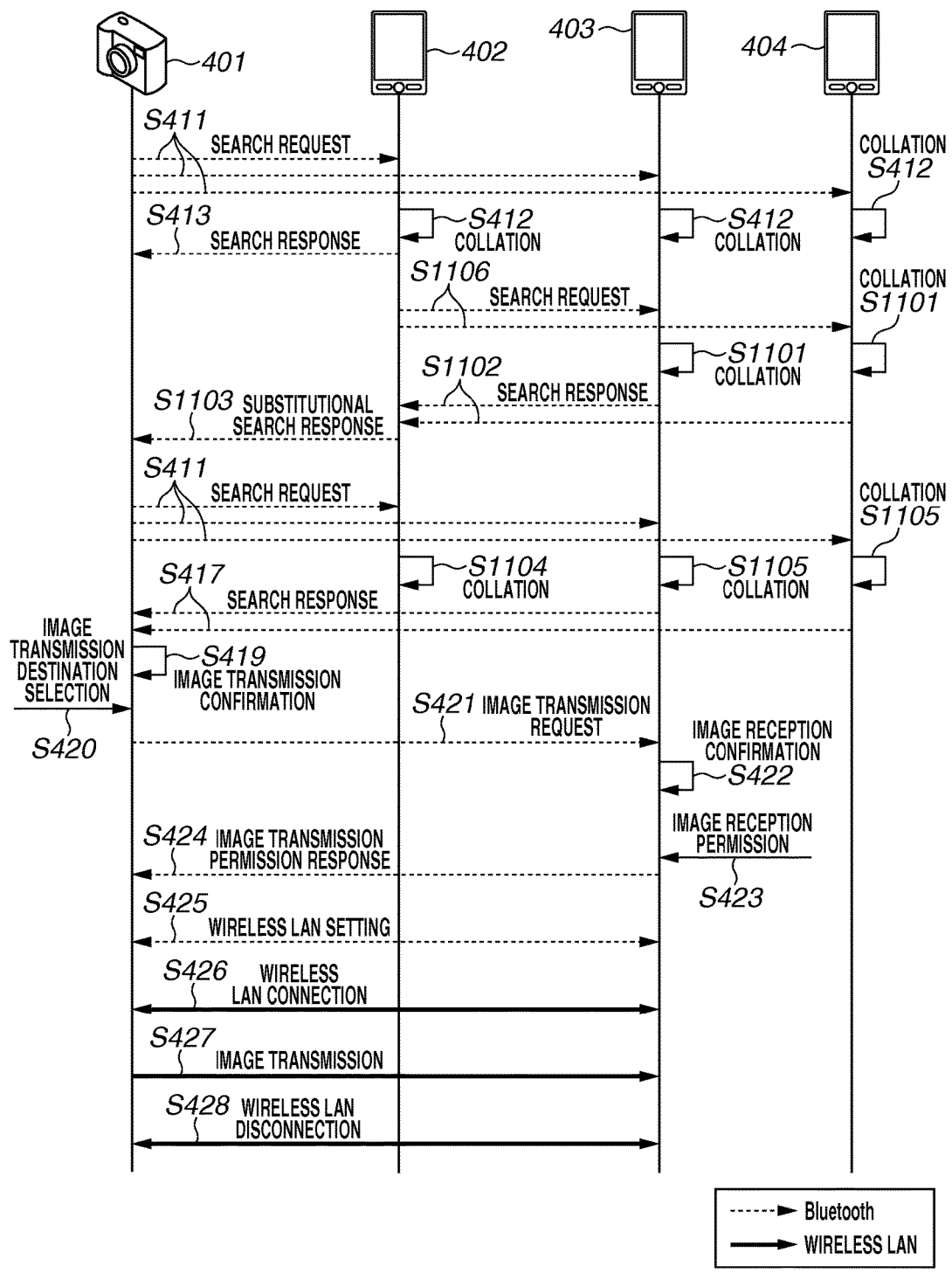
FIG. 11 is a sequence diagram illustrating a schematic procedure of communications that can be performed between the digital camera and the smartphone according to a third exemplary embodiment.

FIG. 11 is a sequence diagram illustrating a flow of processing (including device search and image transmission) that can be performed by the communication system according to the present exemplary embodiment. It is assumed that the sequential processing illustrated in FIG. 11 can be started in a state where both of the Bluetooth (registered trademark) and wireless LAN functions are set to be valid in each device. Steps similar to those illustrated in FIG. 4 are denoted by the same reference numerals and redundant description thereof will be avoided.

The digital camera 401 starts the sequential processing illustrated in FIG. 11 when a user clicks the sharing icon 201 on the touch panel of the operation unit A105.

If the smartphones 402 to 404 receive a search request in step S411, then in step S412, each of the smartphones 402 to 404 determines whether the digital camera 401 is already registered in the contact address list 300 or the pairing device list 310. The collation processing to be performed in step S412 will be described in detail below.

In the following description, it is assumed that the digital camera 401 is already registered in the pairing device list 310 of the smartphone 402, and is not yet registered in the contact address list 300 and the pairing device list 310 of respective smartphones 403 and 404.

If the processing in step S413 has been completed, then in step S1106, the smartphone 402 broadcasts a search request to surrounding devices via the Bluetooth (registered trademark) connection. In this case, the search request to be transmitted by the smartphone 402 includes information (e.g., the device name 301) about own device and information (e.g., the device name 301) about the digital camera 401.

If the smartphones 403 and 404 receive the search request in step S1106, then in step S1101, each of the smartphones 403 and 404 determines whether the smartphone 402 is already registered in the contact address list 300 or the pairing device list 310. Through the above-described processing, each smartphone can determine whether to accept the search request directed to the information about the digital camera 401 (the device name 301) included in the search request S415. Then, if it is determined to accept the search request, each smartphone registers the information about the digital camera 401 (the device name 301) in its own permission list 1400.

In the following description, it is assumed that the smartphone 402 is already registered in the contact address list 300 of respective smartphones 403 and 404, and each of the smartphones 403 and 404 has determined to accept the search request from the digital camera 401.

In step S1102, the smartphones 403 and 404 transmit a search response to the smartphone 402 via the Bluetooth (registered trademark) connection. In this case, the search response to be transmitted by respective smartphones 403 and 404 can include information (e.g., the device name 301, the user name 302, and the BD address 311) about own device.

If the smartphone 402 receives the search response in step S1102, then in step S1103, the smartphone 402 transmits a substitutional search response to the digital camera 401 via the Bluetooth (registered trademark) connection. In this case, the substitutional search response S1103 to be transmitted by the smartphone 402 does not include any device information (e.g., the device name 301, the user name 302, and the BD address 311) about the smartphones 403 and 404.

If the digital camera 401 receives the substitutional search response in step S1103, then in step S411, the digital camera 401 broadcasts a search request (i.e., an advertisement).

If the smartphones 403 and 404 receive the search request S411, then in step S1105, each of the smartphones 403 and 404 determines whether the digital camera 401 is already registered in the permission list 1400. In the present exemplary embodiment, it is determined that the digital camera 401 has been already registered because the processing in step S1101 has confirmed that the information about the digital camera 401 is registered in the permission list 1400.

In step S417, the smartphones 403 and 404 transmit a search response to the digital camera 401 via the Bluetooth (registered trademark) connection. In this case, the search response to be transmitted by the smartphones 403 and 404 includes information (e.g., the device name 301, the user name 302, and the BD address 311) about own device.

On the other hand, if in step S1104 the smartphone 402 detects that the search request in step S411 is the one already received from the digital camera 401, the smartphone 402 does not perform any processing to prevent the search request in step S415 from being issued again.

Subsequently, the digital camera 401 and respective smartphones 403 and 404 perform processing similar to that in steps S419 to S428 illustrated in FIG. 4.

<Operation of Each Apparatus>

Subsequently, an operation that can be performed by the digital camera to realize the above-described operation will be described in detail below with reference to FIG. 12. Steps similar to those illustrated in FIG. 5 are denoted by the same reference numerals and redundant description thereof will be avoided.

Figure 12:
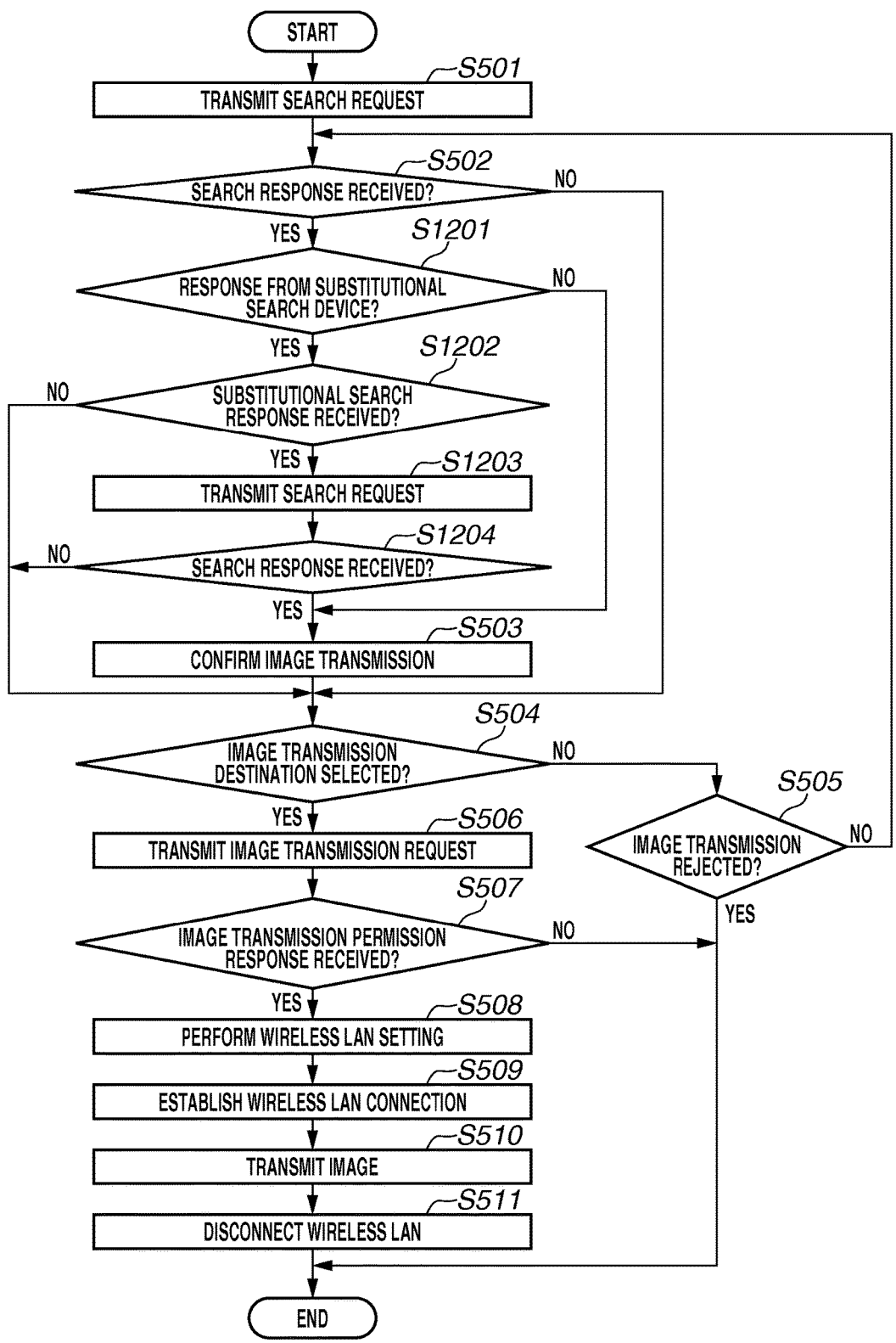
FIG. 12 is a flowchart illustrating an operation that can be performed by the digital camera according to the third exemplary embodiment.

FIG. 12 is a flowchart illustrating an operation that can be performed by the digital camera A100 according to the present exemplary embodiment.

In step S501, the control unit A101 broadcasts a search request to surrounding devices via the short-range wireless communication unit A112. In this case, the search request to be transmitted by the control unit A101 includes information (e.g., the device name 301 and the BD address 311) about own device. The processing to be performed in step S501 corresponds to the processing performed in step S411 illustrated in FIG. 11.

In step S502, the control unit A101 determines whether a search response has been received from other device via the short-range wireless communication unit A112. If the control unit A101 determines that there is a search response having been received (YES in step S502), the operation proceeds to step S1201. If the control unit A101 determines that no search response has been received (NO in step S502), the operation proceeds to step S504.

In step S1201, the control unit A101 determines whether the search response received in step S502 is originated from a substitutional search device stored in the pairing device list 700. If the control unit A101 determines that the search response has been received from the substitutional search device (YES in step S1201), the operation proceeds to step S1202. If the control unit A101 determines that the received search response is not originated from the substitutional search device (NO in step S1201), the operation proceeds to step S503.

In step S1202, the control unit A101 determines whether the response received from the substitutional search device via the short-range wireless communication unit A112 is a normal search response or a substitutional search response. If the control unit A101 determines that the received response is the substitutional search response (YES in step S1202), the operation proceeds to step S1203. If the control unit A101 determines that the received response is the normal search response (NO in step S1202), the operation proceeds to step S504.

The processing in step S1203 is similar to that in step S501. The control unit A101 broadcasts a search request to surrounding devices via the short-range wireless communication unit A112. In this case, the search request to be transmitted by the control unit A101 includes information (e.g., the device name 301 and the BD address 311) about own device.

The processing performed in step S1204 is similar to that in step S502. The control unit A101 determines whether a search response has been received from another device via the short-range wireless communication unit A112. If the control unit A101 determines that there is a search response having been received (YES in step S1204), the operation proceeds to step S503. If the control unit A101 determines that no search response has been received (NO in step S1204), the operation proceeds to step S504.

The digital camera A100 according to the present exemplary embodiment can perform the above-described sequential operations.

Subsequently, an operation that can be performed by the smartphone to realize the above-described operation will be described in detail below with reference to FIG. 13. Steps similar to those illustrated in FIG. 6 are denoted by the same reference numerals and redundant description thereof will be avoided.

Figure 13:
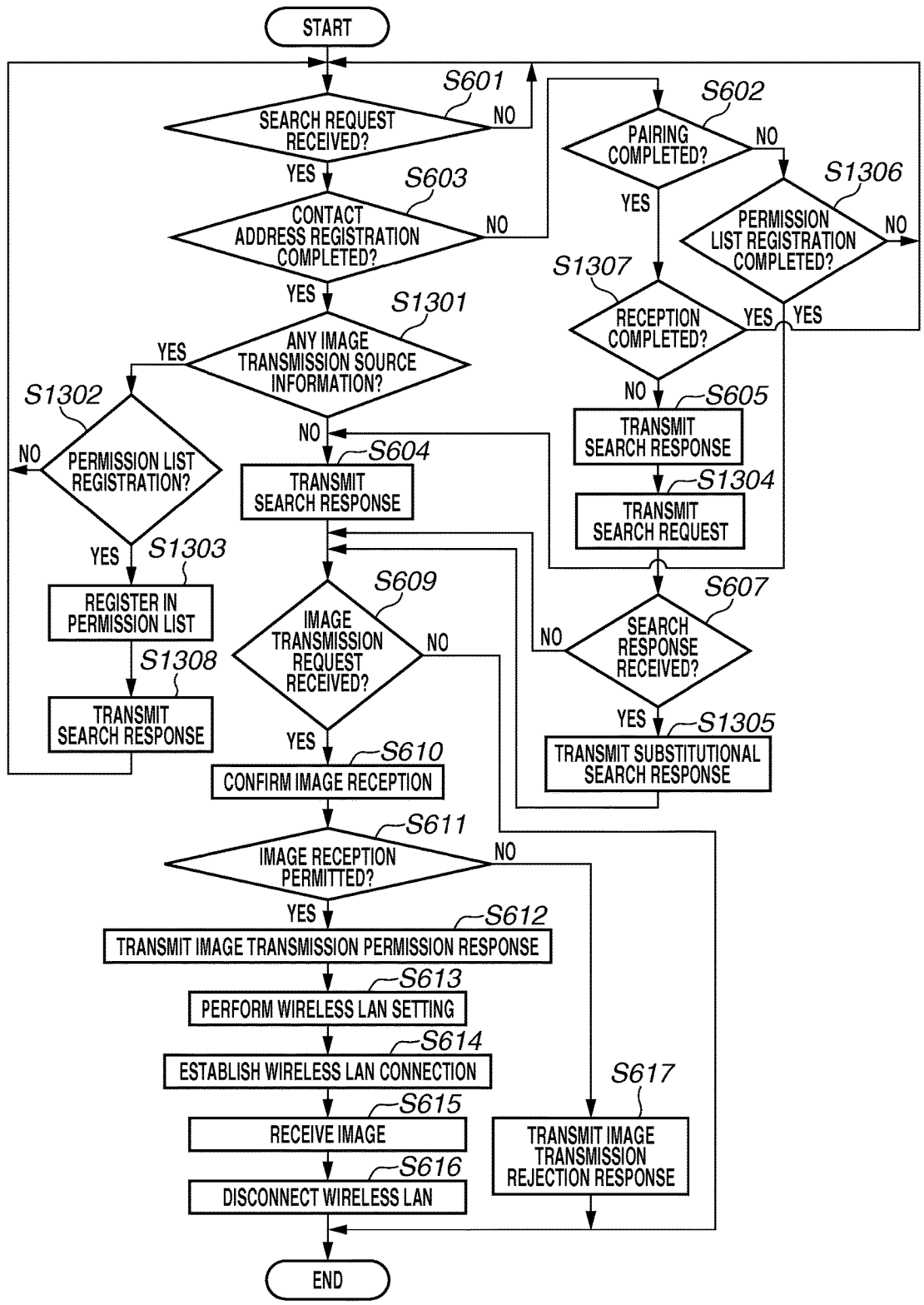
FIG. 13 is a flowchart illustrating an operation that can be performed by the smartphone according to the third exemplary embodiment.

FIG. 13 is a flowchart illustrating processing that can be performed by the smartphone B100 according to the present exemplary embodiment.

In step S603, the control unit B101 determines whether the device name 301 included in the search request is already registered in the contact address list 300. If the control unit B101 determines that the device name 301 is already registered in the contact address list 300 (YES in step S603), the operation proceeds to step S1301. On the other hand, if the control unit B101 determines that the device name 301 is not yet registered in the contact address list 300 (NO in step S603), the operation proceeds to step S602.

In step S1301, the control unit B101 determines whether image transmission source information (e.g., the device name 301 and the BD address 311) is included in the search request. If the control unit B101 determines that the image transmission source information is included (YES in step S1301), the operation proceeds to step S1302. On the other hand, if the control unit B101 determines that the image transmission source information is not included (NO in step S1301), the operation proceeds to step S604.

In step S1302, the control unit B101 determines whether to register the image transmission source information in the permission list 1400 according to the settings designated beforehand by a user via the operation unit B105. In this case, it may be useful that the control unit B101 does not register anything if a user instruction has not received beforehand. If it is determined that the image transmission source information is registered in the permission list 1400 (YES in step S1302), the operation proceeds to step S1303. On the other hand, if it is determined that the image transmission source information is not registered in the permission list 1400 (NO in step S1302), the operation returns to step S601.

In step S1303, the control unit B101 registers the image transmission source information in the permission list 1400.

In step S1308, the control unit B101 transmits a search response to the device to which the search request has been transmitted (see step S1304) via the short-range wireless communication unit B112. In this case, the control unit B101 identifies the device with reference to the BD address 311 included in the search request. Further, the search response to be transmitted to the control unit B101 can include information (e.g., the device name 301, the user name 302, and the BD address 311) about own device. The processing to be performed in step S1308 corresponds to the processing performed in step S1102 illustrated in FIG. 11.

In step S602, the control unit B101 determines whether the BD address 311 included in the search request is already registered in the pairing device list 310. If the control unit B101 determines that the BD address is already registered in the pairing device list 310 (YES in step S602), the operation proceeds to step S1307. On the other hand, if the control unit B101 determines that the BD address is not yet registered in the pairing device list 310 (NO in step S602), the operation proceeds to step S1306. Processing to be performed in steps S602 and S604 corresponds to the processing performed in step S412 illustrated in FIG. 11.

In step S1307, the control unit B101 determines whether the search request is originated from the already reception completed device. If the control unit B101 determines that the reception is not yet completed (NO in step S1307), the operation proceeds to step S605. On the other hand, if the control unit B101 determines that the reception is already completed (YES in step S1307), the operation returns to step S601.

The processing performed in step S605 is similar to that in step S603. The control unit B101 transmits a search response to the image transmission source device that has transmitted the search request via the short-range wireless communication unit B112. The processing to be performed in step S605 corresponds to the processing performed in step S413 illustrated in FIG. 11.

In step S1304, the control unit B101 broadcasts a search request to surrounding devices via the short-range wireless communication unit B112. In this case, the search request transmitted by the control unit B101 includes information (e.g., the device name 301 and the BD address 311) about own device and information (e.g., the device name 301 and the BD address 311) about the image transmission source. The processing to be performed in step S1304 corresponds to the processing performed in step S1106 illustrated in FIG. 11.

In step S607, the control unit B101 determines whether a search response has been received from at least one device via the short-range wireless communication unit B112. If the control unit B101 determines that there is a search response having been received (YES in step S607), the operation proceeds to step S1305. If the control unit B101 determines that no search response has been received (NO in step S607), the operation proceeds to step S609. In this case, it is useful for the control unit B101 to repeat the above-described processing in step S607 for a predetermined time to receive search responses from two or more devices.

In step S1305, the control unit B101 transmits a substitutional search response to the image transmission source device via the short-range wireless communication unit B112. The processing to be performed in step S1305 corresponds to the processing performed in step S1103 illustrated in FIG. 11.

In step S1306, the control unit B101 determines whether the device name 301 and the BD address 311 included in the search request are already registered in the permission list 1400. If the control unit B101 determines that the device name 301 and the BD address 311 are already registered in the permission list 1400 (YES in step S1306), the operation proceeds to step S604. On the other hand, if the control unit B101 determines that the device name 301 and the BD address 311 are not yet registered in the permission list 1400 (NO in step S1306), the operation returns to step S601.

The smartphone B100 according to the present exemplary embodiment can perform the above-described sequential operations.

As described above, the smartphone B100 according to the present exemplary embodiment can search for surrounding devices in place of the digital camera, and can mediate the device information about the digital camera. Therefore, it becomes feasible to receive a search response from a device that has not yet registered the digital camera therein. Further, in the present exemplary embodiment, the smartphone 402 can perform image transmission without notifying the digital camera of device information about the smartphones 403 and 404.

<Schematic System Configuration>

In the above-described third exemplary embodiment, information about an image transmission source device is added in the substitutional search by the smartphone 402. The smartphones 403 and 404 acquire the information about the image transmission source device and register the acquired information in their permission lists to establish image transmission communication. On the other hand, in a fourth exemplary embodiment, the smartphone 402 adds one-time ID to each of the substitutional search and the substitutional search response. The image transmission source device and the smartphones 403 and 404 can share common device information to establish image transmission communication, as described in detail below. The one-time ID will be described in detail below in step S1704 illustrated in FIG. 17.

The fourth exemplary embodiment is similar to the third exemplary embodiment. Therefore, characteristic features of the present exemplary embodiment will be described mainly.

A communication system according to the present exemplary embodiment is schematically described below with reference to FIG. 15.

Figure 15:
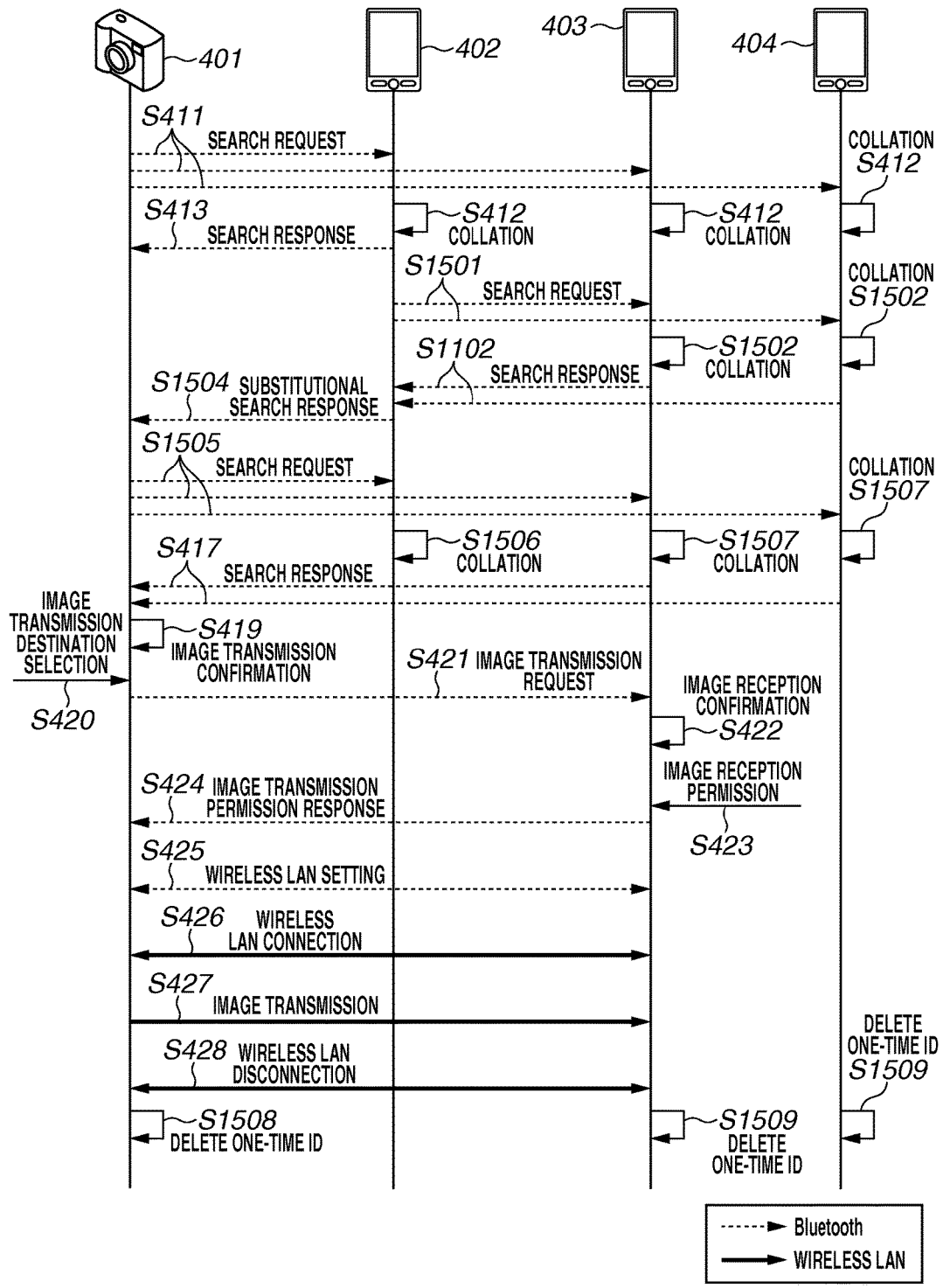
FIG. 15 is a sequence diagram illustrating a schematic procedure of communications that can be performed between the digital camera and the smartphone according to a fourth exemplary embodiment.

FIG. 15 is a sequence diagram illustrating a flow of processing (including device search and image transmission) that can be performed by the communication system according to the present exemplary embodiment. It is assumed that the sequential processing illustrated in FIG. 15 can be started in a state where both of the Bluetooth (registered trademark) and wireless LAN functions are set to be valid in each device. Steps similar to those illustrated in FIG. 11 are denoted by the same reference numerals, and redundant description thereof will be avoided.

The digital camera 401 starts the sequential processing illustrated in FIG. 15 when a user clicks the sharing icon 201 on the touch panel of the operation unit A105.

In the following description, it is assumed that the digital camera 401 is already registered in the pairing device list 310 of the smartphone 402, and is not yet registered in the contact address list 300 and the pairing device list 310 of respective smartphones 403 and 404.

After the processing in step S413 has been completed, then in step S1501, the smartphone 402 broadcasts a search request to surrounding devices via the Bluetooth (registered trademark) connection. In this case, the search request transmitted by the smartphone 402 includes information (the device name 301) about own device and one-time ID.

If the smartphones 403 and 404 receive the search request S1501, then in step S1502, each of the smartphones 403 and 404 determines whether the smartphone 402 is already registered in the contact address list 300 or the pairing device list 310. Thus, each of the smartphones 403 and 404 determines whether to accept the search request with respect to the one-time ID included in the search request S1501. Then, if it is determined to accept the search request, each of the smartphones 403 and 404 registers the one-time ID in its own permission list 1400. It may be also useful to permit registering the one-time ID in the permission list 1400 only within a predetermined time. For example, it is useful to delete the one-time ID from the permission list 1400 when a predetermined time has elapsed, when the communication has been disconnected a predetermined number of times, or when a predetermined operation has been performed. For example, the predetermined operation is completion of transferring a piece of image data, completion of transferring one file, or switching of an operation mode of the digital camera 401 (e.g., switching from an image transfer mode to an image capturing mode).

In the following description, it is assumed that the smartphone 402 is already registered in the contact address list 300 of respective smartphones 403 and 404, and each of the smartphones 403 and 404 determines to accept the one-time ID from the smartphone 402. Further, it is assumed that the one-time ID is deleted when the processing of transferring an image has been completed.

If the smartphone 402 receives the search response in step S1102, then in step S1504, the smartphone 402 transmits a substitutional search response to the digital camera 401 via the Bluetooth (registered trademark) connection. In this case, the smartphone 402 adds the one-time ID to the substitutional search response in step S1504.

If the digital camera 401 receives the substitutional search response in step S1504, then in step S1505, the digital camera 401 broadcasts a search request (i.e., an advertisement). In this case, the digital camera 401 adds the one-time ID to the search request in step S1505.

If the smartphones 403 and 404 receive the search request in step S1505, then in step S1507, each of the smartphones 403 and 404 determines whether the one-time ID notified by the digital camera 401 is already registered in the permission list 1400. In the present exemplary embodiment, the smartphones 403 and 404 determine that the one-time ID is already registered in the permission list 1400 because the registration of the one-time ID in the permission list 1400 has been completed in step S1502.

In step S417, the smartphones 403 and 404 transmit a search response to the digital camera 401 via the Bluetooth (registered trademark) connection. In this case, the search response to be transmitted by the smartphones 403 and 404 includes information (e.g., the device name 301, the user name 302, and the BD address 311) about own device.

On the other hand, if, in step S1506, the smartphone 402 detects that the search request in step S1505 is the one already received from the digital camera 401, the smartphone 402 does not perform any processing to prevent the search request in step S1501 from being issued again.

Subsequently, the digital camera 401 and respective smartphones 403 and 404 perform processing similar to that in steps S419 to S428 illustrated in FIG. 11.

If the wireless LAN connection is disconnected in step S428, then in step S1508, the digital camera 401 deletes the one-time ID notified by the smartphone 402 in step S1504.

Further, in step S1509, respective smartphones 403 and 404 delete the one-time ID notified by the smartphone 402 in step S1501.

<Operation of Each Apparatus>

Subsequently, an operation that can be performed by the digital camera to realize the above-described operation will be described in detail below with reference to FIG. 16. Steps similar to those illustrated in FIG. 12 are denoted by the same reference numerals and redundant description thereof will be avoided.

Figure 16:
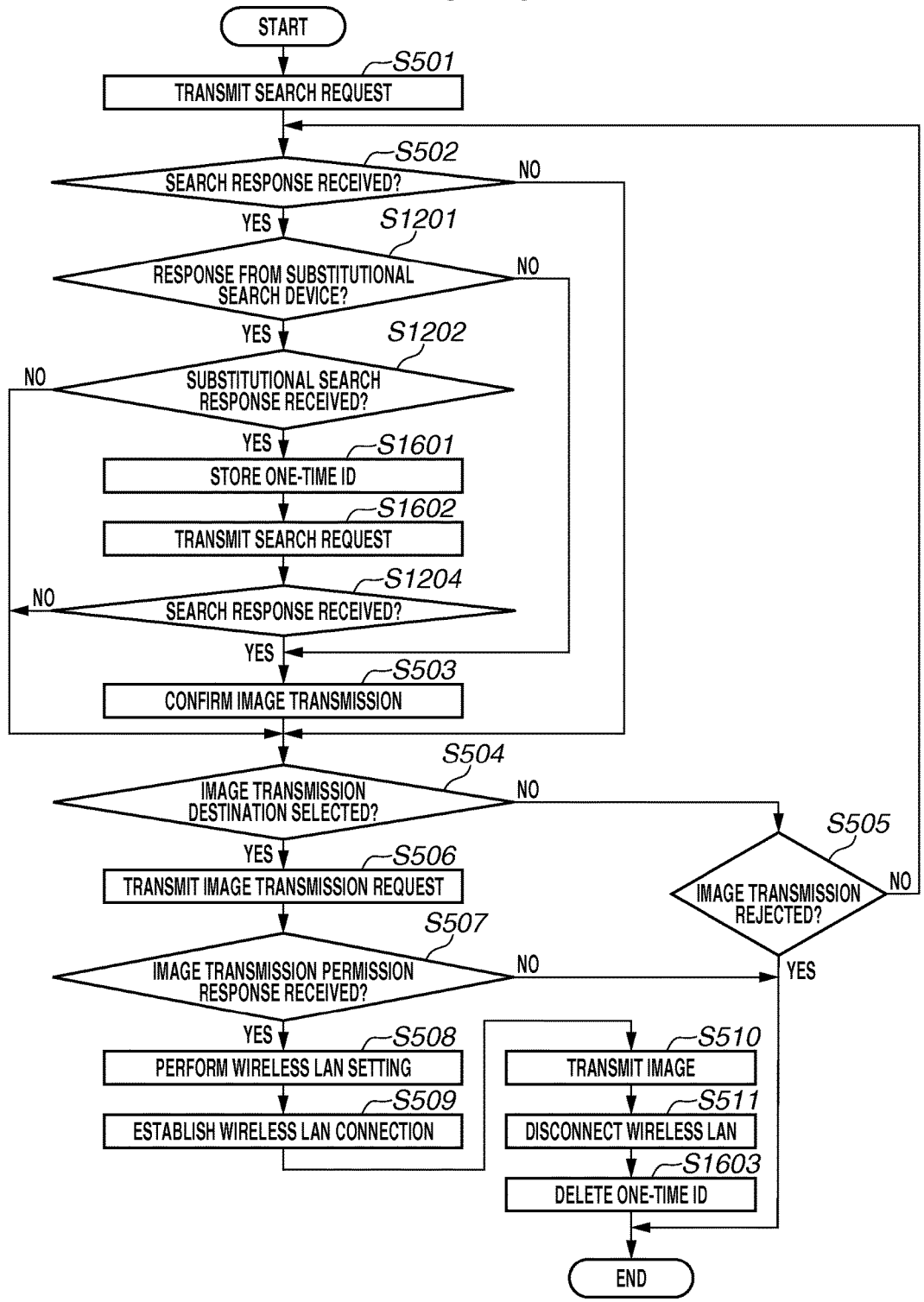
FIG. 16 is a flowchart illustrating an operation that can be performed by the digital camera according to the fourth exemplary embodiment.

FIG. 16 is a flowchart illustrating an operation that can be performed by the digital camera A100 according to the present exemplary embodiment.

In step S1601, the control unit A101 stores the one-time ID added to the substitutional search response received in step S1202 in the nonvolatile memory A103.

The processing performed in step S1602 is similar to that in step S1203. The control unit A101 broadcasts a search request to surrounding devices via the short-range wireless communication unit A112. In this case, the search request to be transmitted by the control unit A101 includes the one-time ID stored in step S1601.

In step S1603, the control unit A101 deletes the one-time ID stored in step S1601 from the nonvolatile memory A103.

The digital camera A100 according to the present exemplary embodiment can perform the above-described sequential operations.

Subsequently, an operation that can be performed by the smartphone to realize the above-described operation will be described in detail below with reference to FIG. 17. Steps similar to those illustrated in FIG. 13 are denoted by the same reference numerals and redundant description thereof will be avoided.

Figure 17:
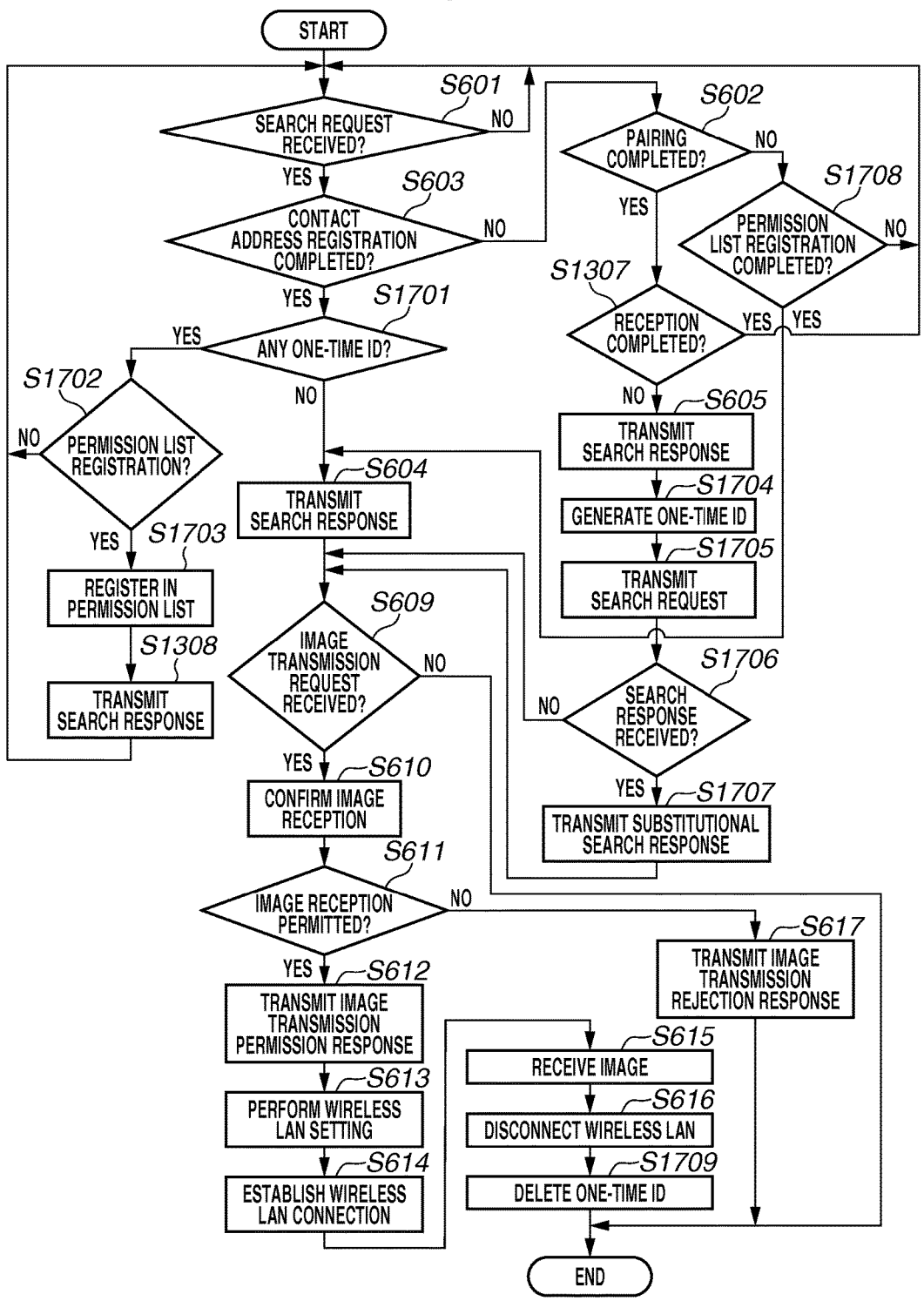
FIG. 17 is a flowchart illustrating an operation that can be performed by the smartphone according to the fourth exemplary embodiment.

FIG. 17 is a flowchart illustrating processing that can be performed by the smartphone B100 according to the present exemplary embodiment.

In step S1701, the control unit B101 determines whether the one-time ID (e.g., the device name 301 and the BD address 311) is included in the search request. If the control unit B101 determines that the one-time ID is included (YES in step S1701), the operation proceeds to step S1702. On the other hand, if the control unit B101 determines that the one-time ID is not included (NO in step S1701), the operation proceeds to step S604.

In step S1702, the control unit B101 determines whether to register the one-time ID in the permission list 1400. If it is determined to register the one-time ID in the permission list 1400 (YES in step S1702), the operation proceeds to step S1703. On the other hand, if it is determined to register no one-time ID in the permission list 1400 (NO in step S1702), the operation returns to step S601.

In step S1703, the control unit B101 registers the one-time ID in the permission list 1400.

In step S1704, the control unit B101 generates one-time ID. The one-time ID includes information having a format that is similar to that of the permission list 1400. The smartphone 402 can generate a value of the one-time ID. In this case, the value to be generated by the smartphone 402 is required to be differentiated from the device information (e.g., the device name 301, the user name 302, and the BD address 311) about the digital camera 401 and respective smartphones 402, 403, and 404. The one-time ID value can take a unique value or a random value. However, in a case where there is a plurality of devices determined in step S604 as having been pairing completed, the control unit B101 generates a unique value for each one-time ID.

In step S1705, the control unit B101 broadcasts a search request to surrounding devices via the short-range wireless communication unit B112. In this case, the search request to be transmitted by the control unit B101 includes information (e.g., the device name 301 and the BD address 311) about own device together with the one-time ID generated in step S1704. The processing to be performed in step S1705 corresponds to the processing performed in step S1501 illustrated in FIG. 15.

In step S1706, the control unit B101 determines whether a search response has been received from at least one device via the short-range wireless communication unit B112. If the control unit B101 determines that the search response has been received (YES in step S1706), the operation proceeds to step S1707. If the control unit B101 determines that the search response has not been received (NO in step S1706), the operation proceeds to step S609. In this case, it is useful for the control unit B101 to repeat the above-described processing in step S1706 for a predetermined time to receive search responses from two or more devices.

In step S1707, the control unit B101 transmits a substitutional search response to the image transmission source device via the short-range wireless communication unit B112. In this case, the substitutional search response to be transmitted by the control unit B101 includes the one-time ID. The processing to be performed in step S1707 corresponds to the processing performed in step S1504 illustrated in FIG. 15.

In step S1708, the control unit B101 determines whether the one-time ID included in the search request is already registered in the permission list 1400. If the control unit B101 determines that the one-time ID is already registered in the permission list 1400 (YES in step S1708), the operation proceeds to step S604. On the other hand, if the control unit B101 determines that the one-time ID is not yet registered in the permission list 1400 (NO in step S1708), the operation returns to step S601.

In step S1709, the control unit B101 deletes the one-time ID registered in the permission list 1400 in step S1703.

The smartphone B100 according to the present exemplary embodiment can perform the above-described sequential operations.

As described above, the smartphone B100 according to the present exemplary embodiment can search for surrounding devices in place of the digital camera, and can temporarily set device information required for communication establishment. Therefore, it becomes feasible to receive a search response from a device that has not yet registered the digital camera therein. Further, the image transmission according to the present exemplary embodiment is performed without using the device information about the digital camera. Therefore, even when the image transmission is performed by referring to a temporary relationship, it is unnecessary for each smartphone to keep device information about the digital camera.

<Schematic System Configuration>

In the above-described third exemplary embodiment, information about an image transmission source device is added in the substitutional search by the smartphone 402. The smartphones 403 and 404 acquire information about the image transmission source device. On the other hand, in a fifth exemplary embodiment, a cloud network server manages the smartphone 402 in association with the information about the image transmission source device beforehand, and each smartphone can acquire the information about the image transmission source device from the server as described in detail below.

The present exemplary embodiment is similar to the third exemplary embodiment. Therefore, characteristic features of the present exemplary embodiment will be described mainly.

FIG. 20 illustrates an example of information to be referred to in determining the processing to be performed next when the smartphone B100 receives a search request from another device via the Bluetooth (registered trademark) connection to realize a communication system according to the present exemplary embodiment.

Information recorded in a cloud registration completed device list 2010 includes, at least, device name 2001 and BD address (Bluetooth (registered trademark) device address) 2011, for each cloud ID 2012. The cloud registration completed device list 2010 can be read from a cloud server 1801, and can be stored in the nonvolatile memory B103. The smartphone B100 connects with the cloud server 1801 in compliance with wireless public network standards and updates the cloud registration completed device list 2010. In this case, the cloud server 1801 is a server PC connected to the public network D100. Any device to which unique cloud ID is allocated can access the cloud server 1801.

The communication system according to the present exemplary embodiment is schematically described below with reference to FIG. 18.

Figure 18:
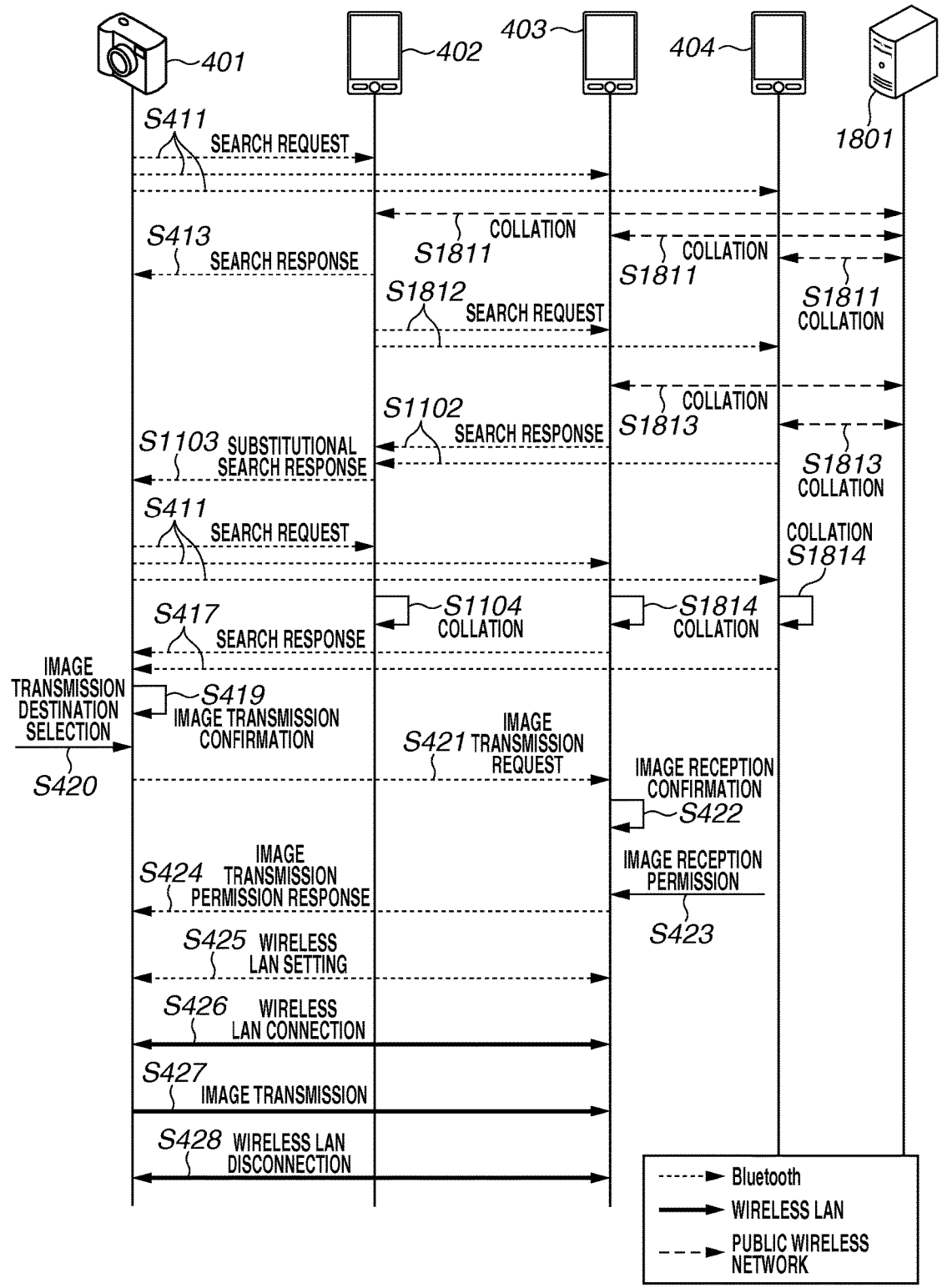
FIG. 18 is a sequence diagram illustrating a schematic procedure of communications that can be performed between the digital camera and the smartphone according to a fifth exemplary embodiment.

FIG. 18 is a sequence diagram illustrating a flow of processing (including device search and image transmission) that can be performed by the communication system according to the present exemplary embodiment. It is assumed that the sequential processing illustrated in FIG. 18 can be started in a state where all of the Bluetooth (registered trademark), wireless LAN, and wireless public network functions are set to be valid in each device. Steps similar to those illustrated in FIG. 11 are denoted by the same reference numerals, and redundant description thereof will be avoided.

The digital camera 401 starts the sequential processing illustrated in FIG. 18 when a user clicks the sharing icon 201 on the touch panel of the operation unit A105.

If, in step S411, the smartphones 402 to 404 receive a search request, then in step S1811, each of the smartphones 402 to 404 connects with the cloud server 1801 and determines whether the digital camera 401 is already registered in the cloud registration completed device list 2010.

In the following description, it is assumed that the digital camera 401 is already registered in the cloud registration completed device list 2010 of the smartphone 402, and is not yet registered in the contact address list 300 and the cloud registration completed device list 2010 of respective smartphones 403 and 404.

After the processing in step S413 has been completed, then in step S1812, the smartphone 402 broadcasts a search request to surrounding devices via the Bluetooth (registered trademark) connection. In this case, the search request to be transmitted by the smartphone 402 includes information (e.g., the device name 301) about own device and cloud ID required to access the cloud registration completed device list 2010 of own device, which is stored in the cloud server 1801. In this case, the cloud ID stored in the cloud server 1801 is an identifier required to access the cloud registration completed device list 2010. Each smartphone can access only list information relating to its own cloud ID 2012 in the cloud registration completion list 2010.

If the smartphones 403 and 404 receive the search request in step S1812, then in step S1813, each of the smartphones 403 and 404 determines whether the smartphone 402 is already registered in the contact address list 300. In a case where the smartphone 402 is already registered in the contact address list 300, each of the smartphones 403 and 404 determines whether to accept a search request from each device registered in the list based on the cloud ID included in the search request in step S1812, with reference to the cloud registration completed device list 2010 of the smartphone 402 stored in the cloud server 1801. Further, in a case where the smartphone 402 determines to accept the search request, then in step S1102, each of the smartphones 403 and 404 transmits a search response to the smartphone 402.

In the following description, it is assumed that the smartphone 402 is already registered in the contact address list 300 of respective smartphones 403 and 404. In addition, it is assumed that each of the smartphones 403 and 404 determines to accept a search request from each device registered in the cloud registration completed device list 2010 of the smartphone 402.

If the smartphones 403 and 404 receive the search request in step S411, then in step S1814, each of the smartphones 403 and 404 determines whether the digital camera 401 is already registered in the cloud registration completed device list 2010 of the smartphone 402, which is stored in the cloud server 1801. In the present exemplary embodiment, it is determined that the digital camera 401 has been already registered because the digital camera 401 is already registered in the cloud registration completed device list 2010 of the smartphone 402. Therefore, in step S417, each of the smartphones 403 and 404 transmits a search response.

Subsequently, the digital camera 401 and respective smartphones 402, 403, and 404 perform processing similar to that in steps S419 to S428 illustrated in FIG. 11.

<Operation of Each Apparatus>

A detailed operation that can be performed by the digital camera to realize the above-described operation according to the present exemplary embodiment is similar to that illustrated in FIG. 12, and redundant description thereof will be avoided.

Subsequently, an operation that can be performed by the smartphone to realize the above-described operation will be described in detail below with reference to FIG. 19. Steps similar to those illustrated in FIG. 13 are denoted by the same reference numerals, and redundant description thereof will be avoided.

Figure 19:
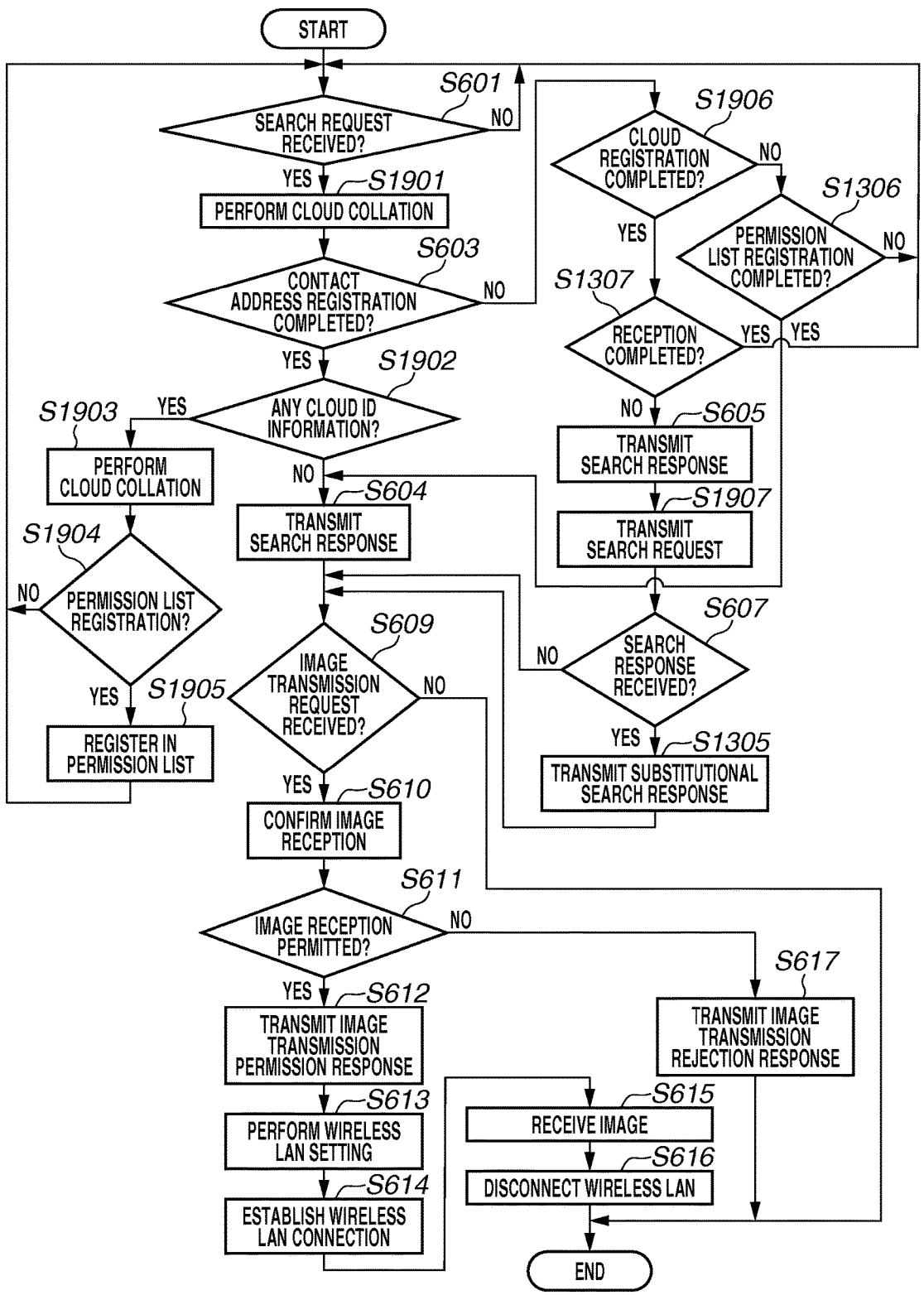
FIG. 19 is a flowchart illustrating an operation that can be performed by the smartphone according to the fifth exemplary embodiment.

FIG. 19 is a flowchart illustrating processing that can be performed by the smartphone B100 according to the present exemplary embodiment.

In step S1901, the control unit B101 establishes a wireless public network connection with the cloud server 1801 via the public wireless communication unit B113, the base station C100, and the public network D100. Then, the control unit B101 acquires information about the cloud registration completion list 2010 with reference to the cloud ID of own device.

In step S1902, the control unit B101 determines whether the cloud ID is included in the search request. If the control unit B101 determines that the cloud ID is included (YES in step S1902), the operation proceeds to step S1903. On the other hand, if the control unit B101 determines that the cloud ID is not included (NO in step S1902), the operation proceeds to step S604.

In step S1903, the control unit B101 establishes the wireless public network connection with the cloud server 1801 via the public wireless communication unit B113, the base station C100, and the public network D100. Then, the control unit B101 acquires the information about the cloud registration completion list 2010 with reference to the cloud ID acquired from the search request in step S1902.

In step S1904, the control unit B101 determines whether to register individual device information (e.g., the device name 2001 and the BD address 2011) registered in the cloud registration completion list 2010 acquired in step S1903 in the permission list 1400. If the control unit B101 determines to register the individual device information (e.g., the device name 2001 and the BD address 2011) in the permission list 1400 (YES in step S1904), the operation proceeds to step S1905. On the other hand, if the control unit B101 determines not to register the individual device information (e.g., the device name 2001 and the BD address 2011) in the permission list 1400 (NO in step S1904), the operation returns to step S601.

In step S1905, the control unit B101 registers the individual device information (e.g., the device name 2001 and the BD address 2011) in the permission list 1400.

In step S1906, the control unit B101 determines whether the BD address 311 included in the search request is already registered in the cloud registration completed device list 2010. If the control unit B101 determines that the BD address is already registered in the cloud registration completed device list 2010 (YES in step S1906), the operation proceeds to step S1307. On the other hand, if the control unit B101 determines that the BD address is not yet registered in the cloud registration completed device list 2010 (NO in step S1906), the operation proceeds to step S1306.

In step S1907, the control unit B101 broadcasts a search request to surrounding devices via the short-range wireless communication unit B112. In this case, the search request to be transmitted by the control unit B101 includes the cloud ID of own device. The processing to be performed in step S1907 corresponds to the processing performed in step S1812 illustrated in FIG. 18.

The smartphone B100 according to the present exemplary embodiment can perform the above-described sequential operations.

As described above, the smartphone B100 according to the present exemplary embodiment can search for surrounding devices in place of the digital camera, and can mediate the device information of the digital camera via the cloud server. Therefore, it becomes feasible to receive a search response from a device that has not yet registered the digital camera therein. Further, in the present exemplary embodiment, the device information about the digital camera can be notified to surrounding smartphones via the cloud server. Therefore, it is unnecessary for a smartphone that performs a substitutional search operation to broadcast the device information about the digital camera.

Other Embodiments

In the above-described exemplary embodiments, searching for surrounding devices in place of the image transmission source device is performed on condition that the pairing has been completed. However, the condition for performing substitutional search can be a search request from the same user. For example, it is useful to add user identifier (or similar information) to a search request so that a device that has received the search request can automatically identify the same user based on the identifier and determine whether to transmit a substitutional search request.

The present invention can be realized by performing the following processing. Specifically, the processing includes supplying a software program that can realize functions described in the above-described exemplary embodiments via a network or an appropriate storage medium to a system or an apparatus and causing a computer (or a central processing unit (CPU) or a micro-processing unit (MPU)) included in the system or the apparatus to read and execute program codes. In this case, the program and the storage medium storing the program can constitute the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-089533 filed Apr. 23, 2014, which is hereby incorporated by reference herein in its entirety.

What is claimed is:

1. A communication apparatus comprising:
   a first communication unit configured to connect with an external apparatus via communication in compliance with a first communication method; and
   a control unit configured to control the communication to be performed by the first communication unit,
   wherein, in a case where the first communication unit receives a search request including information indicating that an external apparatus is a transmission source from the external apparatus via communication in compliance with the first communication method, the control unit determines whether the external apparatus which is the transmission source of the search request including information indicating that the external apparatus is the transmission source has been set to be paired with the communication apparatus via communication in compliance with the first communication method before receiving the search request,
   in a case where the control unit determines the external apparatus has been set to be paired with the communication apparatus, the control unit controls the first communication unit so as to transmit a search request designating the communication apparatus as the transmission source to other apparatus via communication in compliance with the first communication method,
   wherein the control unit controls the first communication unit so as to receive a search response replying to the search request designating the communication apparatus as the transmission source from the other apparatus via communication in compliance with the first communication method,
   wherein the control unit controls the first communication unit so as to transmit information corresponding to the search response received by the first communication unit to the external apparatus via communication in compliance with the first communication method, wherein the information corresponding to the search response contains address information of the other apparatus in compliance with the first communication method for performing communication using the first communication method between the external apparatus and the other apparatus, not via the communication apparatus.

2. The communication apparatus according to claim 1, further comprising:
   a holding unit configured to hold identification information usable to identify the external apparatus that can be registered by a user operation,
   wherein, the control unit determines whether the external apparatus which is the transmission source of the search request including information indicating that the external apparatus is the transmission source has been set to be paired with the communication apparatus via communication in compliance with the first communication method before receiving the search request based on whether identification information of the external apparatus is already held by the holding unit before receiving the search request including information indicating that the external apparatus is the transmission source.

3. The communication apparatus according to claim 1, wherein the search request including the information indicating that the external apparatus is the transmission source, is broadcasted.

4. The communication apparatus according to claim 1, wherein the search request including the information indicating that the external apparatus is the transmission source, is transmitted to the communication apparatus.

5. The communication apparatus according to claim 1, wherein the search request designating the communication apparatus as the transmission source, is broadcasted.

6. The communication apparatus according to claim 1, wherein the first communication method is a Bluetooth communication method.

7. The communication apparatus according to claim 1, further comprising:
   a second communication unit configured to connect with the other apparatus via communication in compliance with a second communication method, which is different from the first communication method,
   wherein the control unit controls the first communication unit so as to broadcast the search request designating the communication apparatus as the transmission source according to a user operation,
   wherein the control unit controls the first communication unit so as to share communication parameters with the other apparatus that has transmitted the search response replying to the search request designating the communication apparatus as the transmission source and selected by a user via communication in compliance with the first communication method, to establish communication in compliance with the second communication method,
   wherein the control unit controls, when the sharing of the communication parameters required in establishing communication in compliance with the second communication method has been completed by the first communication unit, the second communication unit to start establishing communication with the other apparatus in compliance with the second communication method.

8. The communication apparatus according to claim 7, wherein the control unit controls the first communication unit so as to transmit a thumbnail of image data to the other apparatus selected by the user via communication in compliance with the first communication method before sharing the communication parameters required in establishing communication in compliance with the second communication method, and
   wherein the control unit controls, when the communication in compliance with the second communication method is established, the second communication unit so as to transmit the thumbnail transmitted image data to the other apparatus via communication in compliance with the second communication method.

9. The communication apparatus according to claim 7, wherein the second communication method is a wireless LAN communication method.

10. The communication apparatus according to claim 1, wherein the external apparatus is a digital camera.

11. The communication apparatus according to claim 1, wherein no telephone number is allocated to the external apparatus.

12. The communication apparatus according to claim 1, wherein the communication apparatus is a portable telephone.

13. The communication apparatus according to claim 1, wherein a telephone number is allocated to the communication apparatus.

14. The communication apparatus according to claim 1, wherein in a case where the control unit determines the external apparatus has been set to be paired with the communication apparatus, the control unit controls the first communication unit in such a way as to transmit the search request designating the communication apparatus as the transmission source to other apparatus via communication in compliance with the first communication method and transmit a search response replying to the received search request to the external apparatus.

15. A method for controlling a communication apparatus having a first communication unit, comprising:
- determining, in a case where the first communication unit receives a search request including information indicating that an external apparatus is a transmission source from the external apparatus via communication in compliance with the first communication method, whether the external apparatus which is the transmission source of the search request including information indicating that the external apparatus is the transmission source has been set to be paired with the communication apparatus via communication in compliance with the first communication method before receiving the search request;
- transmitting, in a case where, in the determining, the external apparatus is determined to have been set to be paired with the communication apparatus, a search request designating the communication apparatus as a transmission source to other apparatus via communication in compliance with the first communication method;
- receiving a search response replying to the search request designating the communication apparatus as the transmission source from the other apparatus via communication in compliance with the first communication method; and
- transmitting information corresponding to the received search response to the external apparatus via communication in compliance with the first communication method, wherein the information corresponding to the search response contains address information of the other apparatus in compliance with the first communication method for performing communication using the first communication method between the external apparatus and the other apparatus, not via the communication apparatus.

16. A non-transitory computer-readable storage medium storing a program for causing a computer to perform the method according to claim 15.

* * * * *